United States Patent [19]
Aronstein et al.

[11] 3,845,286
[45] Oct. 29, 1974

[54] MANUFACTURING CONTROL SYSTEM FOR PROCESSING WORKPIECES

[75] Inventors: Jesse Aronstein; William E. Harding; Philip M. Zeiss, all of Poughkeepsie, N.Y.

[73] Assignee: International Business Machines Incorporated, Armonk, N.Y.

[22] Filed: Feb. 5, 1973

[21] Appl. No.: 329,494

[52] U.S. Cl............... 235/151.1, 29/430, 198/19, 340/172.5, 444/1
[51] Int. Cl............................................ G06f 15/46
[58] Field of Search ............ 235/151.1, 151; 444/1; 340/172.5; 214/11, 16 R, 16 B; 198/19; 29/208 C, 430

[56] References Cited
UNITED STATES PATENTS

| | | |
|---|---|---|
| 3,576,540 | 4/1971 | Fair et al. .................... 340/172.5 |
| 3,612,243 | 10/1971 | McAllister ...................... 198/19 |
| 3,684,681 | 8/1972 | Dibble ........................ 198/19 X |
| 3,725,867 | 4/1973 | Jordan ........................... 214/11 |
| 3,727,756 | 4/1973 | Koluch et al. ................ 214/16 B |

Primary Examiner—Joseph F. Ruggiero
Attorney, Agent, or Firm—Henry Powers

[57] ABSTRACT

A control system for a manufacturing line configured by a plurality of satellite functional processing stations, each capable of stand-alone operation. The stations are interconnected by a handler or conveyor which transports individual ones of the work-piece from one process sector to the next in response to the control system, so that the units will be sequenced through a prescribed sequence of sectors corresponding to the processing requirements for the workpieces.

19 Claims, 16 Drawing Figures

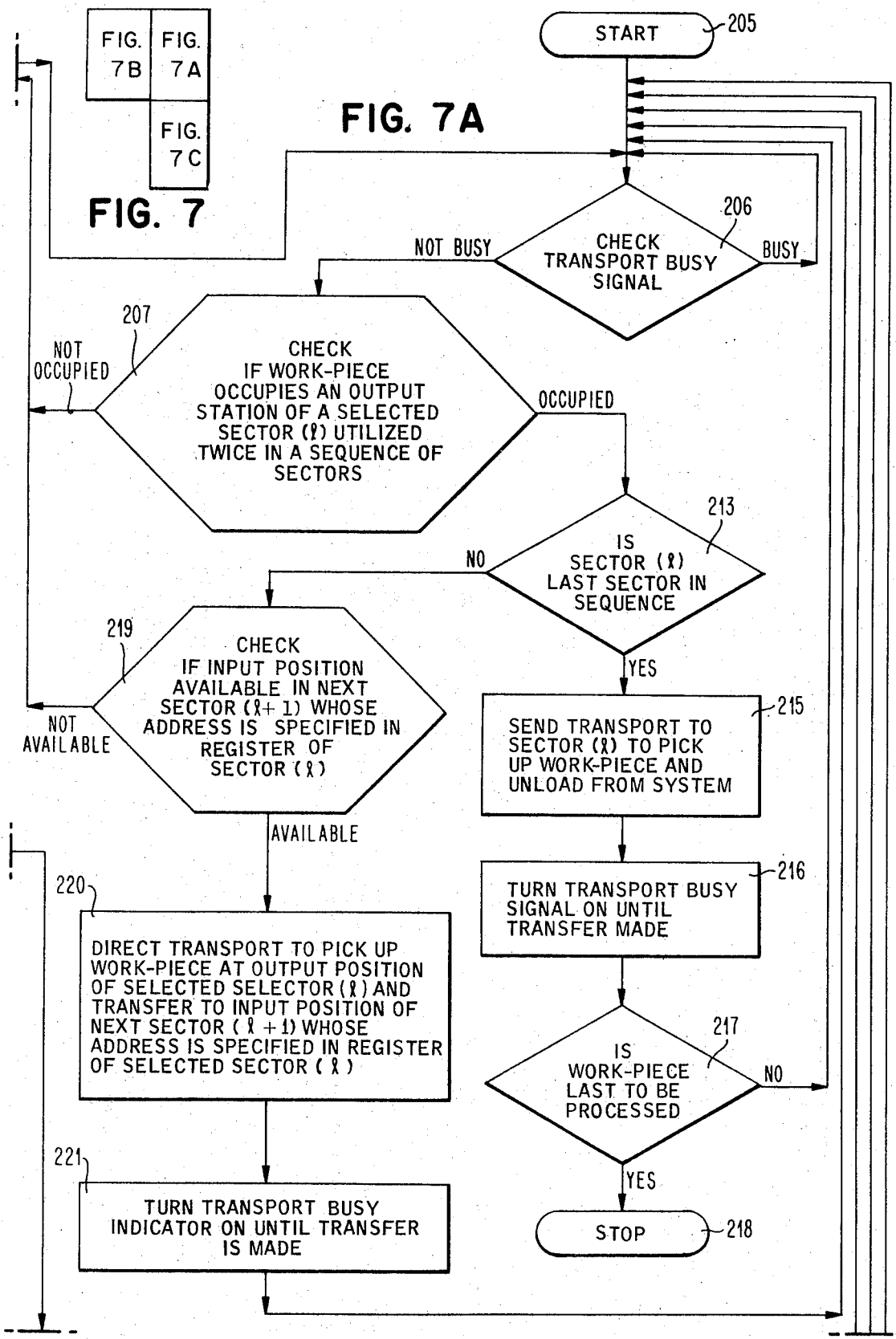

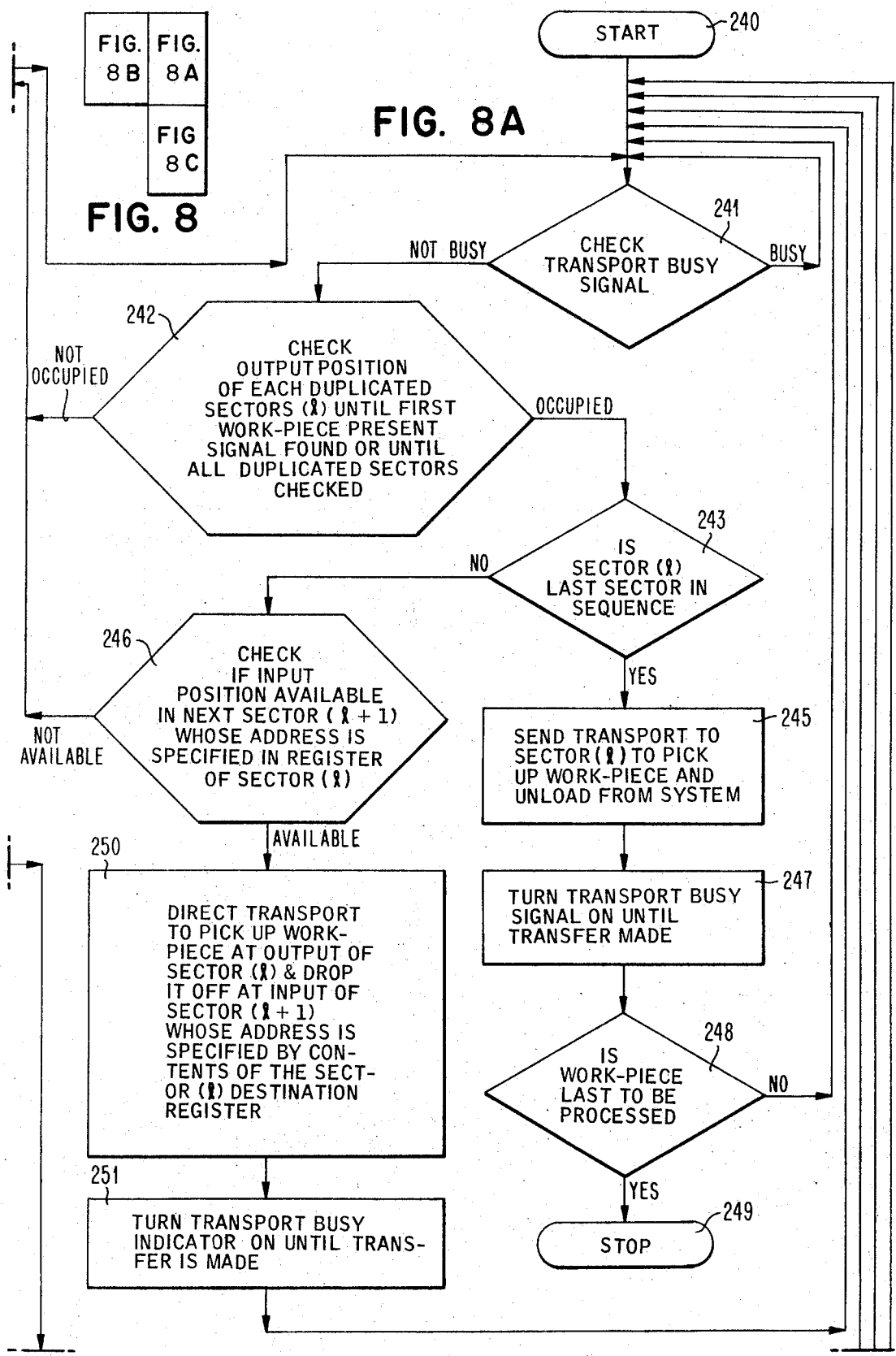

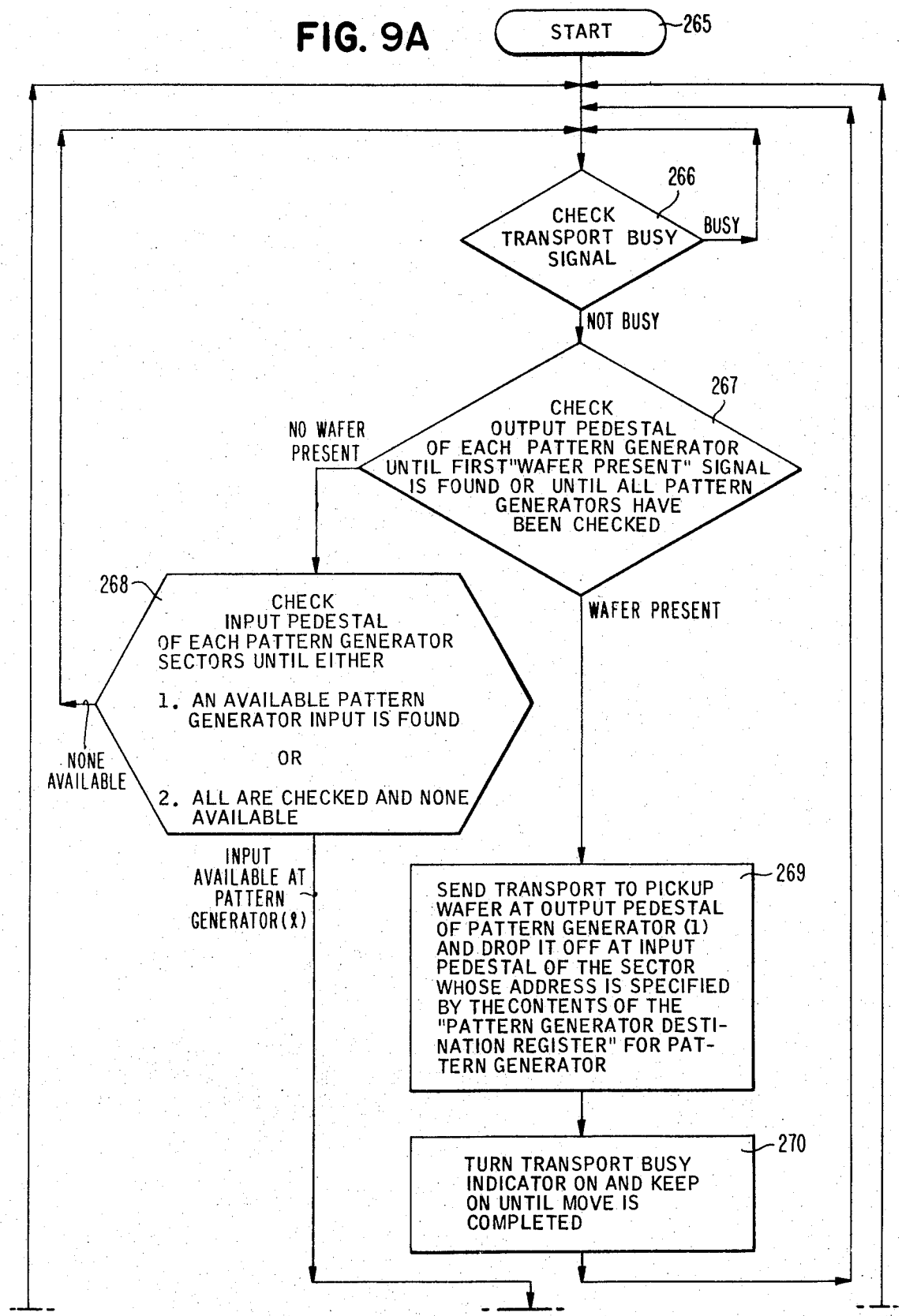

MANUFACTURING CONTROL SYSTEM FOR PROCESSING WORKPIECES

FIELD OF THE INVENTION

This invention is directed to a control system for a complete manufacturing system which has capability of fast turn-around, maximized yield and low in-process inventory. More specifically, the manufacturing system of this invention is directed to operations involving the processing of multiple part numbers wherein the cost of base material and processing is trivial with respect to add-on value, and wherein the improvement comprises the interdependent minization of processing cycle time and maximization of completed part yield.

Although the invention has general application to a wide range of manufacturing systems for processing a corresponding scope of work-pieces, it will be illustratively described with specific reference to a semiconductor manufacturing system to which environment the invention was developed.

DESCRIPTION OF PRIOR ART

As background for the development of the invention in the semiconductor processing environment, it may be noted, that during the early 1960's the industry at large engaged in extensive manufacture of planar semiconductor structures, particularly with respect to silicon diodes and/or transistors. In the processing of semiconductor wafers (e.g. silicon), there were two clearly identifiable modes of batch processing. The first was the wafer itself, where, within it, batching was accomplished by forming a plurality of identical transistors or diodes. Typically, a 1.25 inch diameter wafer could contain 1,000 transistors. For purposes of discussion, this mode of batch processing is defined as "WAFER BATCHING".

A second mode of batching, herein called "MULTIPLE WAFER BATCHING" was also identifiable in various production lines. A typical example of the form of batching in a diffusion step, might employ the processing of 200 wafers simultaneously.

In order to increase output and to lower costs, various manufacturing systems developed throughout the 1960's exploited each of these batching modes.

This mode of batching has some significant negative consequences. First, it is usually done independently for each operation. Thus, the improvement enhances only the thruput and cost for that particular operation. Secondly, it leads to gross batch size mismatch throughout the line creating larger in-process inventories and, thirdly, the technique usually results in process times for the operation itself to be increased. Slight reduction in process yield for the operation is a common result. It should be pointed out that neither of these batching modes affects the number of chips which must be tested and this part of the fabrication contributes significantly to total chip cost.

With the advent of monolithic integrated circuits, a third batching mode was added which herein is called "CHIP BATCHING". This third mode is simply the exploitation of large scale integration as seen and discussed within the semiconductor industries. Typically, this technology permits the increase in the output of a single chip from one transistor to over 1,400 individual transistors and resistors in typical integrated circuits. Normally, this increase of more than/400 times is paid for by only increasing chip size.

With respect to "WAFER BATCHING" it may be noted that this mode of operation does reduce the separate cost/device of each manufacturing step.

One way to improve the advantages of "WAFER BATCHING" is by increasing the size of the wafer, which over the years has progressively increased in sequential steps from an initial diameter of 0.75 inches to presently advanced use of 3.25 inch diameter wafers. However, although such "WAFER BATCHING" can economically improve thruput of a system, it frequently requires significant re-tooling to accommodate its increasing wafer size. Jigs, handlers, racks, etc. may all have to be redesigned and old tools obsoleted. Frequently, significant process modifications must be developed (with their associated costs) to accmmodate tool and process. For example, a completely new diffusion furnace design may be required for an increase in wafer size. In addition, extensions of "WAFER BATCHING" rarely raise yield, and in fact, tend to decrease it.

Examples of improvements over the years utilizing "MULTIPLE WAFER BATCHING" are numerous, typical of which is the use from 8 to 18 and then up to 35 wafers in metallization operation; from 8 to 20 and then to 70 wafers in epitaxial reactors, and from 10 wafers to as many as 300 batched wafers in diffusion operations. Typically, this technology permits the increase in the output of a single chip from one transistor to over 1,400 individual transistors and resistors in typical integrated circuits. Normally, this increase of more than/400 times is paid for by only increasing chip size.

It is the considered opinion of the inventors, of this application, that future improvements in the manufacturing system can make little or no gains in "MULTIPLE WAFER BATCHING" which has already gone to the point where it can hardly make another gain by a factor or tow. Similarly, system based upon extensions of "WAFER BATCHING" can make few gains while running the risk in geometrical problems involving size fragility of wafers, mechanical registration, thermal gradients, etc. are likely to further degrade yields.

One the other hand, "CHIP BATCHING" for large scale integration is just beginning with the potential of increasing thruput at least another factor of at least 10 at perhaps no more than at a price of increasing chip areas by factors of 2 to 4 times. Simultaneously, also obtained will be the added value of the integrated product, reduced testing cause and minimized potential tooling changes.

Irrespective of the batching mode employed, the fabrication of semiconductor devices involved a sequence of many process steps. The number of processing steps varies and is determined by the kind of product and its complexity. The sum of the times required to do all the steps and sequence is called "PROCESSING TIME" and is typically 40 to 60 hours of the present time. Factories based upon "MULTIPLE WAFER BATCHING" have longer "PROCESSING TIME" because the tools, while handling many parts simultaneously, also have characteristics which add to the processing time (longer outgassing time or cooling time in an evaporator, for example). In addition their loading, unloading, and set up times are frequently longer.

In addition to the "PROCESSING TIME", the total cycle time for wafer fabrication includes QUEUE times, which in fact make up the major part of the total time of fabrication. In today's manufacturing lines, total QUEUE times are typically 40 to 60 days. Wafers Queue for many reasons such as the time to assemble the "MULTIPLE WAFER BATCH", equipment down time, waiting while masks are matched to job lot, etc. Individual times can become so long, that extra cleaning steps may result which in turn increase "PROCESSING TIME" and may simultaneously even degrade yield.

SUMMARY OF THE INVENTION

In contrast to the foregoing, the manufacturing system to which the control system of the invention is directed to, is characterized with substantially lower "PROCESSING TIME" and queue times. Each individual process tool is specified so that all of them will function in concert to fabricate a wafer quickly without waiting. In most operations, if not all, wafers will be individually processed on a first-in first-out basis. Instead of designing tools for large throughput, the manufacturing system in conjunction with the control system of this invention comprehends a system with the objectives of high yield and highest dependability of manufacturing equipment.

In its broadest concept, the invention comprehends a control system for a manufacturing in line such as described in greater detail in copending application, U.S. Ser. No. 329,920 filed Feb. 5, 1973 (IBM Docket FI9-72-162) and assigned to the assignee of this application. Shown and described in this copending application is a processing line which the processes to be performed are implemented by tools which are grouped together in sectors. A central transportation system moves product from one sector to another.

In application a manufacturing process of interest is partitioned into functional parts or sectors. Each part consists of a set of process steps designed so that before and after which, the work product may be stored for some period of time without degradation in product quality or expected yield. The reason for partitioning the process this way is to allow accommodation of equipment failure and repair.

The process sectors are comprehended as stand-alone independent processing plants which accomplish a set of process steps and may have a temporary storage unit. Upon sensing the presence of a work-piece at the input port, the sector controls cause the units to be processed through the entire sequence of steps in that sector, and after passing, optionally through an outport. In accordance with well-known techniques, measurements are provided within a sector to allow confirmation of proper operation of tools within the sector and in some cases where desired, to provide send-ahead information for adaptive process controls to be applied in subsequent process sectors. Each of the sectors is also envisioned to be under suitable control, either by general purposes computer or a hard-wired system, to specify and maintain process parameters, and to maintain proper flow of work-pieces for the sector.

The central transport system consists of one or more mobile work-piece carriers which can be commanded to pick up a work-piece from the output port of one sector and bring it to the input port of another sector. The central transport is operated under a control system which can be pre-programmed to specify the required sequence of sectors through which the work-piece is to be transported so that it may undergo a prescribed sequence of processing operations. Logistic control is also contemplated to be employed to enable either the same or different interspersed work-pieces to be processed on a first-in first-out sequence. In operation the control system enables the transport to travel to any of the input or output pedestals of a prescribed sequence of selected sectors for pickup or delivery of the work-piece as required by the processing schedule.

Normally, the work-piece will enter the sstem via a loader built into the overall system or into the initial process sector which will perform an initial set of operations on the work-piece. Upon arrival at the output pedestal of that sector, the central transport handler will be commanded to pick up the work-piece and deliver it to the next (process sequence-wise) process sector, provided that the next sector is known to be in operating condition. Upon arrival at the next sector, the work-piece will be taken through its series of process steps with arrival at an output pedestal for transport to the next sector in the prescribed sequence of sectors.

Repeating this throughout the line, each work-piece is taken in sequence through the manufacturing steps from start to finish. The intra-sector work-piece flow can normally be accomplished by local controls which may be dedicated to each sector. Each sector therefore operates as a machine independent of the others. This mode of operation provides for a fail - soft operation, independent installation and debug of process sectors, featurability of additional process sectors, and accommodation of sector outage due to the equipment failure.

In the simplest form, a total manufacturing system comprehended by this invention can be viewed as comprised of three parts. The first consist of the processing, the specifications and the product, design, etc; the second involves the physical tools which execute the processes and in turn, form the product; and thirdly, the system utilizes controls which regulate the line activity, commands its action and records the status of the production line as for example, production control and supervising the flow of product and material.

The manufacturing system, as further described below, enables product demand to be made in a short time, thus enabling response to changing orders to be maximized, and facilitates reaction to engineering changes. The short processing times enabled by the manufacturing system of this invention also helps in reacting to and correcting out-of-control condition.

A more complete understanding of the invention may be had by reference to the following more detailed description taken in conjunction with the accompanying drawings wherein.

BRIEF DESCRIPTION OF THE DRAWINGS

FIGS. 6 to 9, including FIGS. 6, 7, 7A, 7B, 7C, 8, 8A, 8B, 8C, 9A and 9B, illustrate steps of control systems for various operating modes employed in a representative manufacturing system illustrated with this invention.

DESCRIPTION OF PREFERRED EMBODIMENTS

Figure 1:
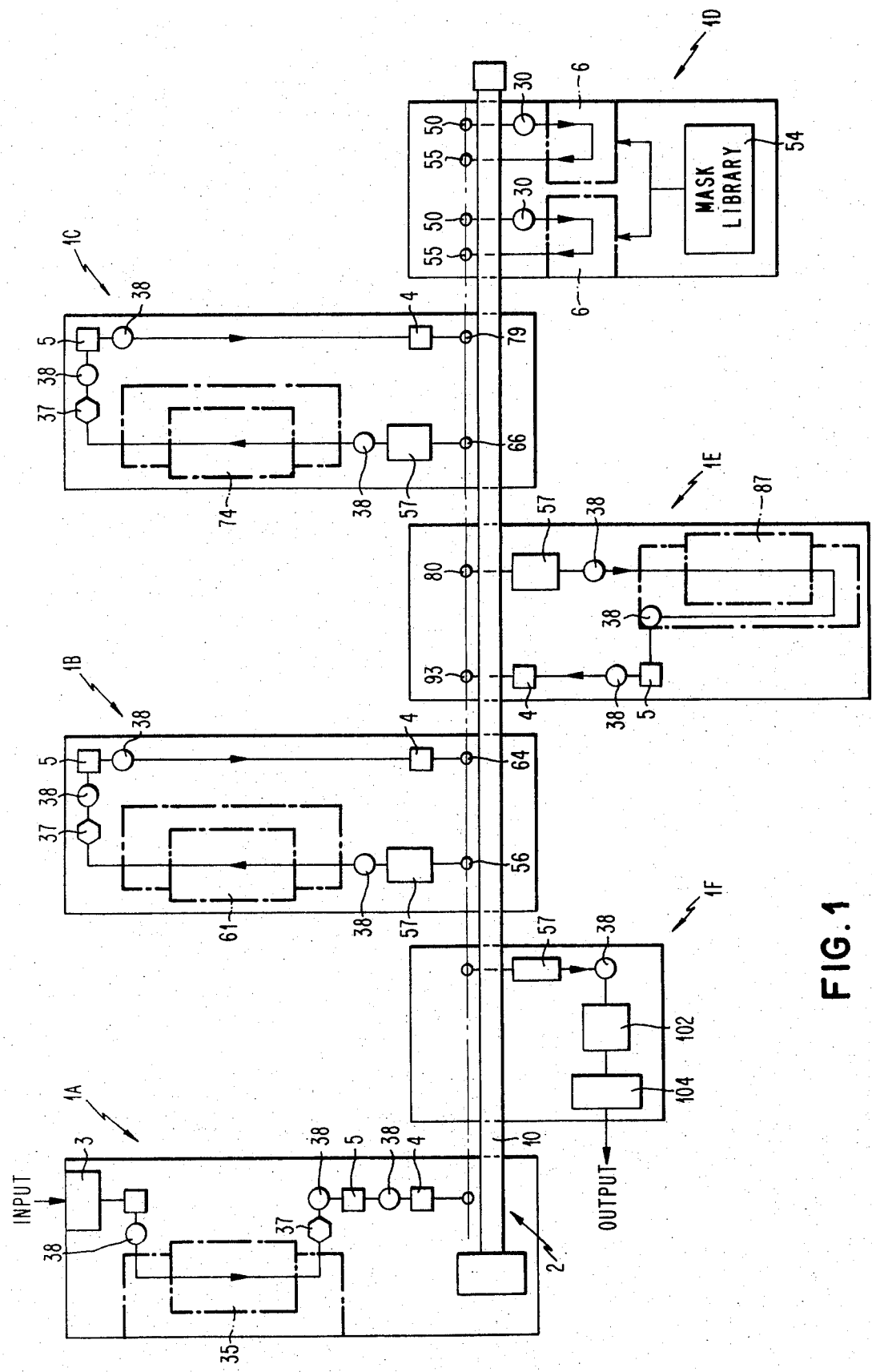
FIG. 1 is a diagrammatic representation in plan view of a manufacturing system embodying the principles of the invention of this application.

Referring to FIG. 1, a manufacturing system is shown whose overall processing operations are partitioned in accordance with the aforesaid copending application Ser. No. 329,920 (IBM Docket FI9-72-162) into independent standalone processing stations or sectors 1A to 1F, each sector comprising a set of processing steps before and after which the product may be stored for some period of time without degradation. Sectors 1A to 1F are in effect independent stand-alone manufacturing plants which accomplish a set of processing steps, and which may have a temporary product storage unit at the output end. Although only six processing sectors are illustrated, it is to be understood that as many sectors as may be required to accommodate the total output of a plant, may be employed from which their preselection and sequencing effected by means of suitable control units well known art for controlling the transfer of a work-piece between the various sectors by a central transport unit or conveyor, generally indicated by numeral 2.

In operation, work-pieces are brought to the input port or loading position of each sector by the central transport unit 2. Upon sensing the presence of a work-piece at an input port or position, the controls of that process sector cause the work-piece to be processed through the entire sequence of steps incorporated in that particular sector, and after passing through the processing operation of that sector, the work-pieces are brought to the output port of that sector for pickup by the central transport for transportation and transfer to the next required sector in a prescribed sequence of work sectors specified by the control unit regulating movement of transport 2.

The central transport 2 may include one or more mobile work-piece carriers which can be commanded to pick up a work-piece from the output port or unloading position, of one sector and bring it to the input port of any other specified sector. Normally, as further described below, a servo control enables the transport to travel to any of the input or output ports or station of the various sectors for pickup or delivery of a work-piece as directed by the control unit.

Where the manufacturing system of this invention is adapted to the manufacture of semiconductor devices, each of the work sectors 1A to 1F will have all the tooling required for effecting one or more semiconductor processing operation assigned to the sector, as for example such as epitaxial growth, metallization, photoresist development, oxide etching, photoresist stripping, impurity diffusion, impurity drive-in, metal etching, formation of dielectric coatings, sputtering, ion implantation, photoresist coating operations, and the like.

For purposes of illustrating a typical semiconductor manufacturing system, the system of FIG. 1 may be correlated to the production of field effect transistor circuits. In such applications, the system will contain all the tooling required producing the field effect transistor circuits, inclusive from raw wafer through aluminum sinter. For production of field effect transistor circuits, the system will include an initial oxidation sector 1A; a source and drain deposition sector 1B; a gate oxidation secsector 1E; and a sintering sector 1F. Except for the align and expose units in the pattern generating sector 1D sectors, the tooling in each of the remainder sectors will be dedicated for each processing series of steps. Normally, single wafers will enter the system at a gated rate and proceed through the sectors on a first-in, first-out basis. Preferrably, buffering will be provided at the output ports of sectors 1A, 1B, 1C and 1E to accommodate any equipment unreliability. Although the buffer units in each sector may take any desired configuration a typical one can be exemplified by that described in co-pending application Ser. No. 203,374, filed Nov. 30, 1971 and assigned to the assignee of this application.

Wafers can be fed into the system via any suitable loader 3 built into the initial sector, e.g. initial oxidation station 1A, which sector will generally perform a set of cleaning operations, growth of an oxide on the wafer, and the application of a layer of photoresist material over the oxide coating.

In addition, it is to be noted that photoresist apply-and-dry and developed-etch-strip operations are coupled into the appropriate hot process sectors to enhance adhesion and cleanliness. These parts of the photolightographic operations are distributed throughout the line in a manner designed to maximize yield and minimize control complexity.

Align and expose apparatus is common for all levels, although the featureability of this system allows the use of various methods where justified for yield, cost, etc.

As indicated previously, the various processing sectors are connected by a central transport system 2 which will include a wafer handler which can pick up a wafer from one sector and deposit it at another. The handler operates on one wafer at a time for sake of mechanical and control simplicity. In the specific FET processing operation shown, the wafer will be transferred eight times during complete processing.

The process sectors 1A to 1F are grouped around the handler as satellite stations so as to simplify the facility. Hot processing sectors are grouped in one area, align and expose section at another, thus facilitating the installation and maintenance of specific environments and services required for each type of tool. For example, the align and expose equipment may require an air-conditioned enclosure, whereas the hot processing equipment may require exhaust ventilation.

The manufacturing system includes four main buffers one at the output of each hot process sector, e.g. initial oxidation sector 1A; source and diffusion deposition sector 1B; gate oxidation sector 1C; and metallization sector 1E. There is normally no need for buffers at the output of the pattern generators units 6 in the resist expose secto 1B, since there internal capacity is only one wafer. Provision may be made however for a one wafer buffer capability at the input to any of the develop-etch-strip operations of the other sections to allow for the possibility that an associated sector may go down while a wafer destined for it is in the align and expose stations. As will be obvious, it is desirable to clear the pattern generating units 6, in the expose sector 1B, so that other levels can still be processed.

Temporary wafer storage buffers 4 are placed at points in the process where storage time does not effect yield, as for example, after the resist apply-and-dry units 5 (in work sectors 1A, 1B, 1C, and 1E) which operation is employed prior to the align and expose operation in the pattern generating units 6 of the resist expose sector 1D. In practice the manufacturing system will be designed with a built-in over capacity of all processing sectors to allow queues to be absorbed after a down-sector is repaired. Operation of the overall manufacturing system is asynchronous; each work sector or sub-sector is to operate on a wafer as soon as it arrives, until its maximum repeat rate is reached.

The first-in, first-out one-wafer at a time operation makes it relatively simple to contain a part number problem. A large variety of different part numbers can be processed using a minimal production control support system, to track wafers within the line. In a production system of this type with a high part number mix, wafer serial and/or part number identity can be verified prior to any of the last three align and expose steps. This can be done during transit in the wafer handler of the central transport unit 2 by relatively simple equipment and state-of-the-art techniques.

Illustrative of such part mix-processing, is the fabrication of an interspersed flow of different part numbers of a family of wafers in which the processing parameters of the various processing sectors, with the exclusion of the pattern generators 6, are substantially the same. In this respect personalization of the various art numbers is effected by suitable reading of the wafer serial and/or part number, to select the appropriate pattern generator 6 for exposing the resist coated wafers at their various levels of processing corresponding to the particular part number of the product mix flow.

Figure 2:
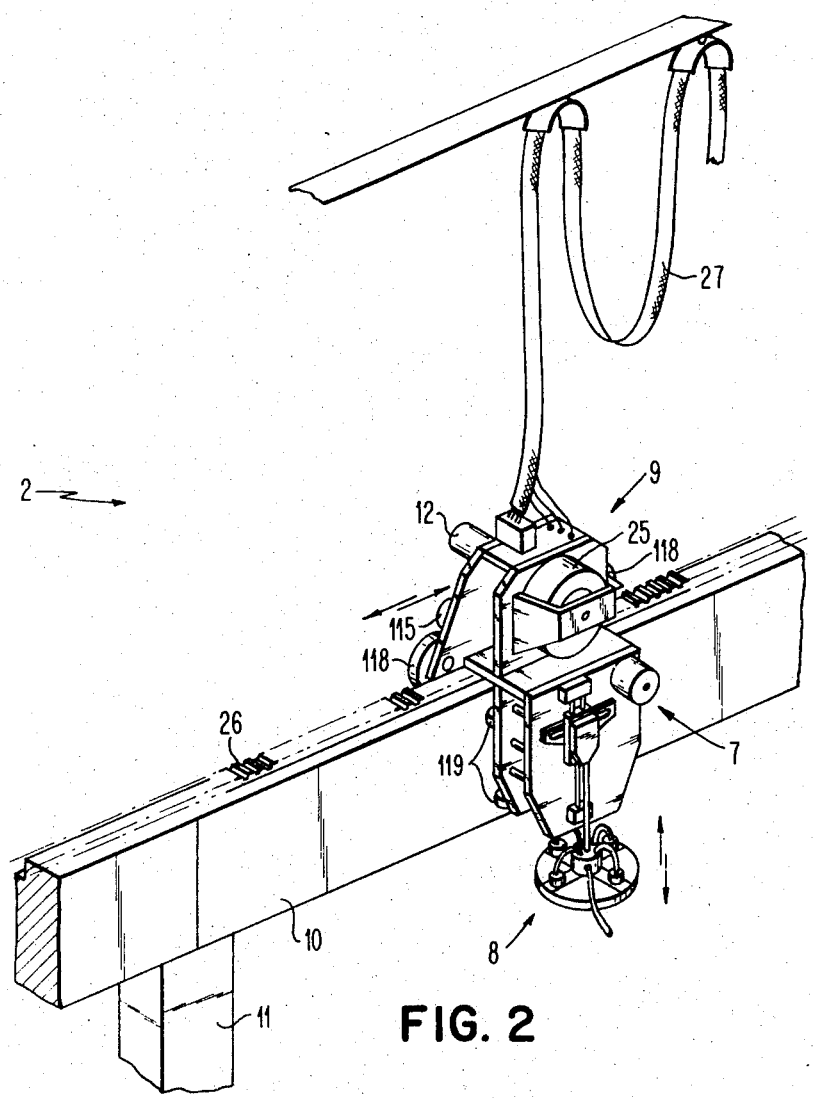
FIG. 2 is a diagrammatic representation in perspective of a transport system suitable for use in the manufacturing system of this invention.

The central transport system 2 can comprise one or more mobile wafers carrier 7 which will include a wafer pickup and release mechanism 8 on a carriage 9 which travels along a guide rail 10 as illustrated in FIG. 2. As shown in the drawing pedestals 11 support the guide rail 10 above and unload pedestals of the various process sectors or stations. In general, input and output positions of all process sectors are on the line below the guide rail. Wafers are picked up, carried and deposited in a horizontal face-up position.

Figure 3:
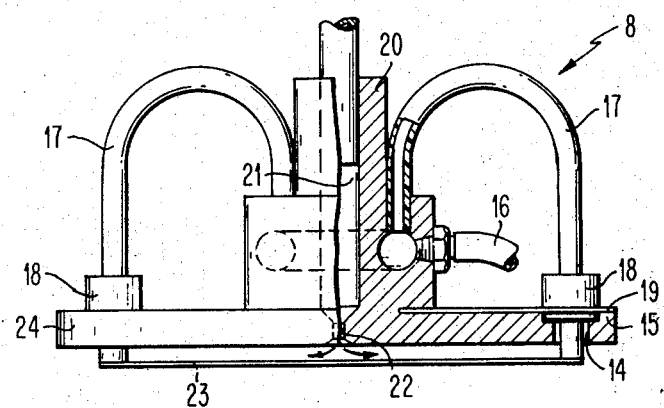
FIG. 3 is an elevational view, partly in section, of a wafer chuck which can be employed in association with the transport system of FIG. 2.

Wafer pickup can be accomplished by a version of the Bernoulli probe, such as shown in FIG. 3 as part of the wafer lifter mechanism, or preferably the wafer pick-up can be of the type shown and described in copending application Ser. No. 319,563 filed Dec. 29, 1972 (IBM Docket FI9–72–137) asigned to the assignee of this application. The wafer pickup 12 illustrated in FIG. 3 comprises a base plate 15 formed with a plurality of peripheral apertures 14 through which are mounted a radial assortment of flexible tubing 17 connected with a vacuum manifold 15 coupled to a source of pressure at the vacuum inputs 16. Mounted about each of the tubings 27 is a yoke unit 18 in which is secured a light leave spring 19 which is anchored at its other end in the body portion 20 to bias the free ends of the tube 17 uniformly out of the front face of support plate 14 so as to secure a wafer thereto when the vacuum is turned on at an appropriate time. Extending through the body portions 20 is an air passage 21 connected to source of positive gas pressure to eject a source or stream of gas out of the nozzle 22 to provide a Bernoulli effect which will raise a wafer 23 against the open ends of tube 17 for securing a wafer thereto under pressure. As it will be noted, the tubes 17 are spaced about base plate 24 for engagement about corresponding peripheral portions of wafer 23.

In general the carriage assembly 9 comprises the pickup head 8, a Z-motion drive motor 7, a drive motor 25 for driving a pinion gear 120 along a rack 26 secured on the upper surface of support rail 10. In general, information for driving or for controlling the movement of the transport system 2 will be transmitted by means of a service cable 27 extending from a control unit which specifies the selected sequence of process sectors through which the wafer is to be sequenced; which sectors are available for pickupat the output of a sector; senses carriage status (availability to pick up a wafer); and carriage location. More specific details of the transport will be described below.

As indicated previously, the process sectors or stations are configured to accomplish a set of process steps which can be done in a rapid sequence to meet highyield objective and for this purpose each sector can be optimized to obtain such result. For this reason, the apparatus within each sector is selected on the basis of highest yield potential.

Each sector will also contain adequate timing, motion, and parameter controls to allow for debug and system operation and maintenance. Additionaly, an interface can be provided to a control system for data collection, wafer tracking, and, where appropriate, over-riding computer control of critical parameters in accordance with well established techniques.

Figure 4:
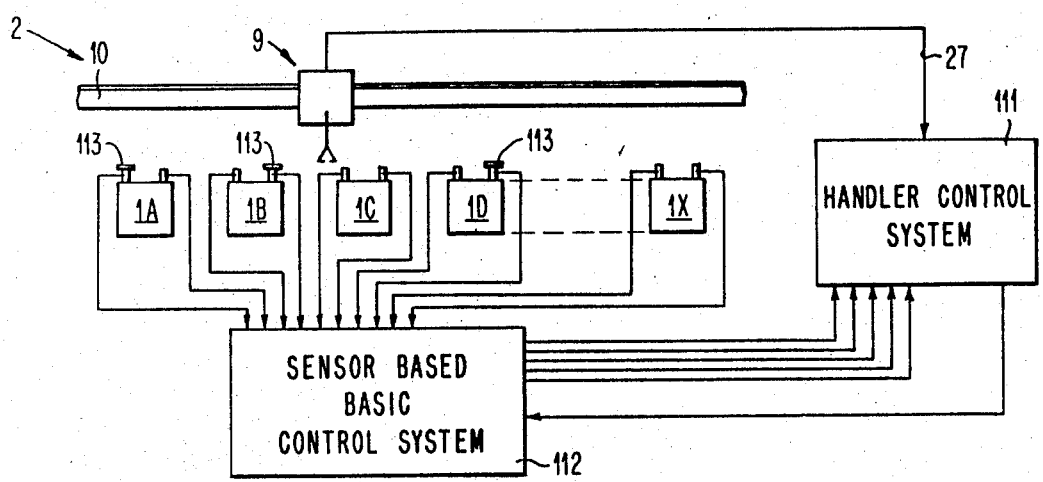
FIG. 4 is a schematic illustration of a control system for use with a manufacturing system in accordance with this invention.

Although the wafer transfer system 2 can take various configuration, one preferred form is that disclosed and described in copending application Ser. No. 319,563 filed Dec. 29, 1972 (IBM Docket FI9-72-137) assigned to the assignee of this application. As described in this copending application, a schematic overview of this parts handling system is illustrated in FIG. 4. As shown, the central transport system 2 will comprise one or more mobile wafer carriers 9 mounted on a rail 10, with the carrier connected by service cable 27 to a handler control system 111. As indicated above, the central transport system is connected to the control system by a cable and a series of input and output pedestals (of each processing sector or station shown in FIG. 4) are distributed along the rail 10 of the transport system. Each of the pedestals associated with the sectors has a "PART PRESENCE" sensor (e.g. photosensor) which sends an electrical signal to a sensor base control system 112, which will perform various functions in the operation of the manufacturing system of this invention, one function of which is to control the movement of parts or work-piece from pedestal to pedestal of the various processing sectors or stations through which the work-piece is sequenced.

The control system 112 will periodically test for a part 113 present at a pedestal. When one is present at an output or unload pedestal, a series of decisions is made before a move is initiated. The designation "output" might refer to the output or pickup point of a tool or collection of tools. The control system 112 decides which tool a work-piece or part 113 should be moved to next, senses that the "input" pedestal or port of the next tool is available (e.g. no part is currently on it) and sends in an address to handler control system 111. The address sents is that of the "output" pedestal containing the part 113 to be moved. The handler control system accepts this address under control of a servo subsystem (described below). When the move has been completed snd the handler 9 has picked up the part, the handler control system 111, which the proceeds to move the carriage or handler 9 to the specified address. At the completion of this movement, the work-piece 113 will then be transferred to the input of the next work sector or station required in a preselected sequence sectors. After this movement, the handler control system 111 again sends a movement complete signal to the control system 112, which now can resume its periodic testing of "output" pedestals for other parts to be moved.

Figure 5:
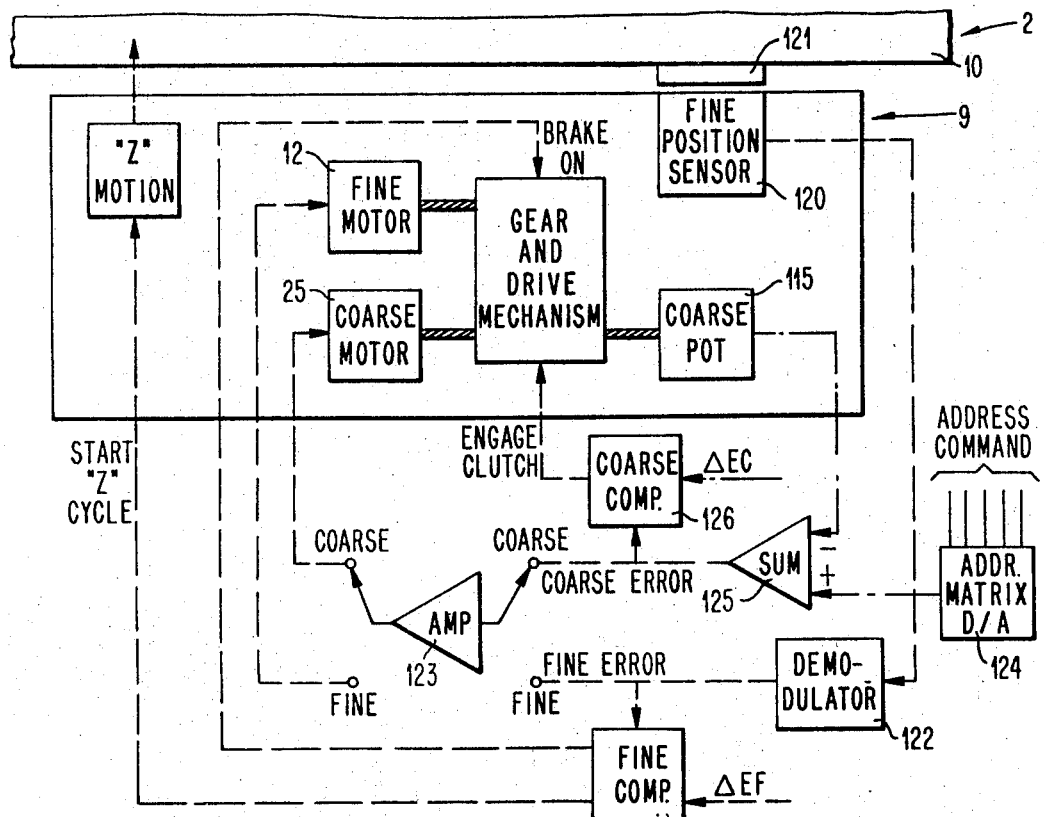
FIG. 5 is a schematic illustration of a control system for a transport system adapted for use in the manufacturing system of this invention.

With reference to FIG. 5, the operation of the system may be considered relative to the status of the system prior to making a move. At this point in time, the carrage 9 will normally be positioned over some input or output pedestal along the rail 10, the identification of which is of no moment for purposes of this consideration. At this time the brake 116 will be on, locking the carriage 9 to the rail 10. To initiate a movement to a different pedestal, a digital address is placed at the input of the address matrix 124. This generates a voltage or coarse address signal at the positive input of the coarse position summing amplifier 125. The current position of the carriage 9 is represented by the voltage from the coarse position potentiometer 115, which appears at the negative input of the summing amplifier 125 is a voltage which is proportional to the distance to be moved and of the proper polarity to drive the carraige 9 in the proper direction. At the outset, this error signal exceeds the magnitude of $\Delta EC$, and the coarse comparators switches the control into the coarse mode. This "switch" connects the coarse error signal through the input of the servo amplifier 123 and connects the output of the servo amplifier 123 to the coarse drive motor 25.

Simultaneously, brake 116 and clutch 123 are released. The brake release allows the carriage 9 to move with respect to ail 10, and the clutch release disengages the fine or vernier motor 12, allowing the coarse motor 25 to drive the carriage. The acceleration of the carriage drive will be determined by the maximum output current of servo amplifier 123. The final running speed will be determined by the maximum output voltage of this servo amplifier. The gain of the servo amplifier will normally be set sufficiently high so that the amplifier operates at in either voltage or current limit until the carriage 9 has traveled to the approximate position of its stopping address. When this point is reached, the value of the coarse error signal will be low enough to allow the servo amplifier 123 to operate in its linear region. Since the mass of the carriage 9 will be quite large and the rolling friction small, braking will be required to decelerate it within the remaining distance of travel. This is done electrically by the servo amplifier 123. As the carriage 9 approahces its stopping address, the output voltage of the servo amplifier 123 will decrease faster than the back EMF of the coarse motor 25. This will cause the current to reverse direction and consequently, the torque also at the shaft of the motor. The amount of reverse current is limited by the amplifier and hence the rate of the deceleration.

As the carriage 9 moves towards the stopping address, the coarse error signal decreases proportionately until it is less than a specified coarse tolerance signal $\Delta EC$. The coarse comparator 126 detects this level and switches to the fine positioning mode. Normally, the compare level, EC will be selected so that the carriage will have entered the range of the fine positioning sensor 120. The switch to the fine mode includes switching the output of the servo amplifier 123 from the coarse potentiometer 115 to the demodulator 122. The carriage 9 will now be driven by the fine positioning motor 12 towards the null position of the fine position sensor 120. This null position will be sensed at the output of the deomdulator by a second comparator 127. When this output becomes less than a specified fine tolerance signal EF, the carriage 9 will have been driven within the required tolerance of the stopping address, and the comparator 127 will switch to the stop mode. This switch includes turning on the brake 116 to lock the carraiage 9 in position on rail 10, and sending a pulse to the "Z-axis" motion mechanism to either pick up or put down a part which may be carried on the chuck 8. When the "Z" motion is completed, a switch closure on the mechanism will signal the control unit that the carriage move has been completed.

As indicated above, the Z-motion mechanism 117 is employed to load/unload work-pieces to and from input/output pedestals on the various processing sectors or stations, e.g. 1A to 1F.

Figure 9B:
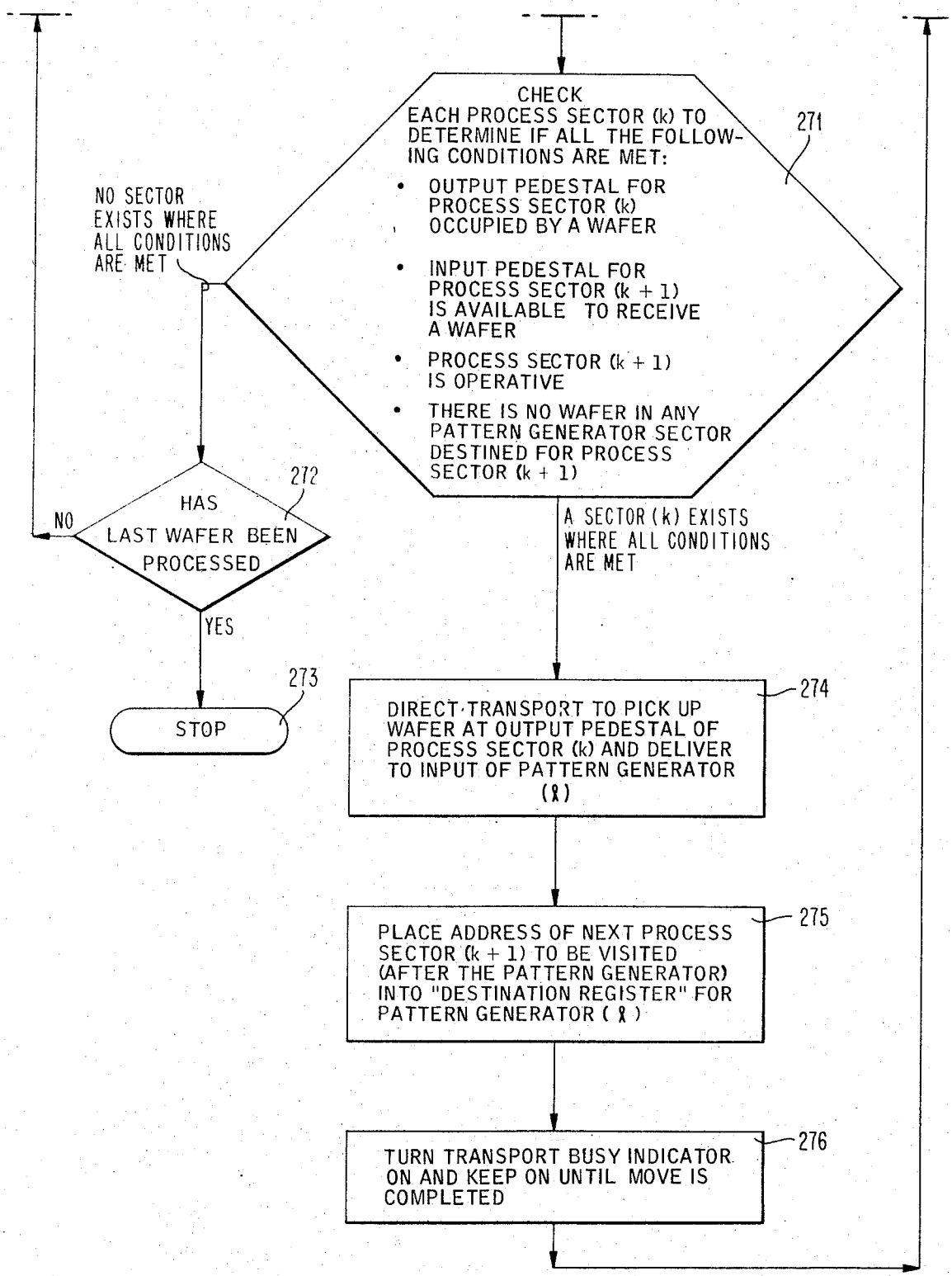

Normally, a plant erected to incorporate the manufacturing system of this mention will be under computer control, and be incorporated in the basic control system unit 112 of FIG. 9. In such an environment, any associated memory of the computer, e.g. tape or disc, may have entered into it a plurality of part programs consisting of a series of instructions specifying the required operations for a work-piece, together with the necessary process parameters within each processing sector as well as means for self-adaptive automatic processing within the sector or between processing sectors. In conjunction with specifying the required sequence of processing operations to be performed, the program will also specify a corresponding preselection of the sequence of process sectors through which a work-piece must be processed to effect its desired total processing. Each part program will be identified by a part number, or other suitable codes which uniquely associates the series of operation to be performed with the particular part on which the operations are to be performed. In addition, the control system will include provision for the storage of additional part programs for a new part number, or modification of existing part programs as required for existing part numbers.

To initiate operation, the control system is informed e.g. by an operator at a console or terminal, of the part number to be processed, whereby the file of the computer memory will be searched for the part program, associated with the part number, for transmittal to the control system. After the transmittal of the part program to the control system, the functional units of each processing sector will be activated to the status required for processing of the work-piece. In conjunction with the main control system each sector can be provided with its own individual control for setting process parameters and for wafer flow within the sector. A sector may be operated as a stand-alone machine such that one can present a wafer at the input pedestal, and it will be processed through to the output pedestal, the sector controls providing for routing of the wafer through the process tubes in that sector, as well as control of parameters within the sector, as for example, temperature, gas flows, etc. such as employed for semiconductor processing.

Each sector control system can communicate with the main control system, which can monitor sector-to-sector work-piece flow, provide adapted control functions, and record required parametric data. In addition, the main control unit can communicate with those factory systems which support the functions of production control design and process automation, quality testing, etc.

The control of process parameters, e.g. temperatures, flows, etc., can be accomplished by standard analog or digital means. Selection of the particular method of control will normally be made on a basis of precision, reliability, cost, compatibility with the unit being controlled and other standard engineering considerations. In some cases it may be desirable to have the main control system set the parameter levels. For example, in a semiconductor processing system, the setting of an etch time can be made a function of the thickness of material measured in the previous sector on the wafer. Overide motor control may also be provided for parameter setting by the main control unit in such caes. In the absence of a signal from the main control unit, the local control (e.g. each sector) must refer to its nominal set point or remain at the set point indicated by the last available main control unit signal, whichever is appropriate for the particular parameter of interest.

Monitoring the functions are also comprehended to insure that equipment failure will not result in catastrophic mishap and also to insure that the process is in control and product is made within allowable specification. The monitoring of process parameters can be done by the main control unit, using redudant sensing elements built into each sector, such that the same sensor will not be used for control of the parameter and for monitoring the parameters. Also, the main control unit can compare critical parameter values against predetermined limits and when required take appropriate action in accordance with techniques well known in the art for notifying maintenance and inhibiting further entry of work-pieces to that sector.

At critical work-piece transfer points within a sector, a signal can be generated for the main control unit to enable it to monitor progress of work-pieces through the sector and to track individual work-pieces for part number control and for correlation of parameter and measurement data with individual work-piece final test results.

As indicated above, among the important functions of such a control unit is for logistic control of work-pieces through the various sectors of the overall manufacturing system, e.g. specifying the manner in which the work-pieces are indexed through a specified sequence of selected processing sectors. A preferred approach for such logistic control of prescribed sequencing of work-pieces through the sectors is disclosed and described in this application. The invention disclosed in this application comprehends various modes of operating the manufacturing system of said copending application Ser. No. 329,920 (IBM Docket FI9-72-162).

In all modes of sequencing a work-piece, the logic of the control system is based on a fixed routing of the work-piece through all processing sectors for each part number of the work-pieces involved. Also, the logic of the movement of work-pieces between sectors is based on knowing the status of the input and output pedestals or positions of each processing sector. Therefore, the logic depends on an "output pedestal status" indicator for each of these sectors. Also, the logic requires a "transport system status" indicator to reflect the unit's availability for movement of the work-pieces through the various processing sectors. Thus, the logic of the various modes of sequencing wafers is based on a continuous polling of the indicators, e.g. input and output status indicators, in such a way as to meet an objective of trying to keep each processing sector's input pedestal occupied by a wafer.

Figure 6:
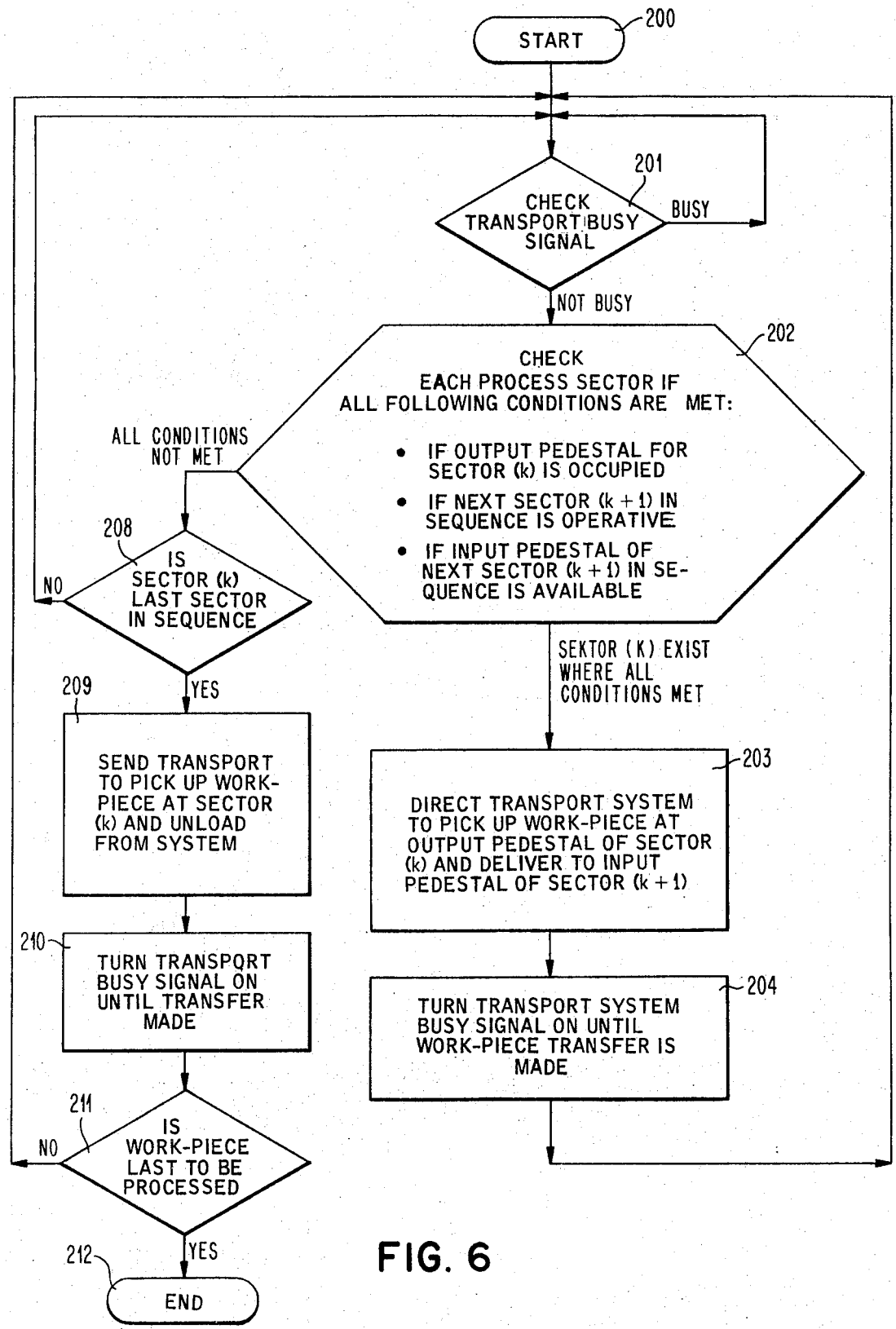

The first mode comprehended in this application relates to the sequencing of work-pieces through a preselected sequence of processing sectors all of which are dedicated to a specific portion of the overall process and where an individual work-piece will only visit such a sector only one time. FIG. 6 illustrates an outline of steps present in this mode of operation. Referring to FIG. 6, the first START Step 200 is employed to initiate the control system for sequencing the work-pieces through the processing sectors. On initiation, the system proceeds to Step 201 to determine if the transport system 2 is presently in the process of transferring a work-piece between sectors. If a positive determination is made to the effect that transport system is at that time transporting a workpiece, the determination of Step 201 is repeated as necessary until the transport unit is found to be free.

If the transport system is found to be available, the control system will proceed to Step 202 for successively checking each of the processing sectors until a sector is found meeting all three of the following conditions:

1. if the output position pedestal for a sector (K) being checked is occupied by a work-piece;
2. if the next succeeding sector (K+1) in the prescribed sequence of sectors is operative; and
3. if the input pedestal of this next sector (K+1) in the sequence is available.

If a negative determination is found for any one of the three forgoing conditions (e.g. all conditions not met) at all sectors, the system at the last sector (K + n) will proceed to Step 208 to determine if the output or unload pedestal of this last sector (K + n) is occupied by a finished work-piece. On a negative determination in Step 208, the system will return to Step 201.

Conversely, if the determination of Step 208 is positive, indicating that the output position of the last sector (K + n) is occupied by a finished work-piee which can be unloaded out of the processing line, the control system is indicated in Step 209, will dispatch the transport system to output pedestal of the last sector (K+ n) to pick up the work-piece and to unload it from the system, while concurrently as Step 210 turning on the transport units busy indicator until the move is made. On completion of the move, the system will proceed to Step 211 to determine if the last scheduled work-piece has been proceeded e.g. no further work-pieces are to be processed. On a positive determination, the system will proceed to stop Step 212 to terminate further operation of the control system; and if a negative determination is made, the control system will return to Step 201.

If a sector (K) is found which first meets all of the conditions specified in Step 202, the system proceeds to Step 203 where the transport system is directed to pick up a work-piece at the output pedestal of the sector (K) and to deliver it to the input pedestal of next processing sector (K+1) of the prescribed sequence of sectors. Concurrently, as indicated in Step 204, turn the transport system busy signal on, which signal will be maintained until the work-piece transfer is made between the indicated processing sectors. On completion of the transfer, the transport busy signal will be turned off, with the control system proceeding to Step 201 for repeating the determination therein.

Figure 7B:
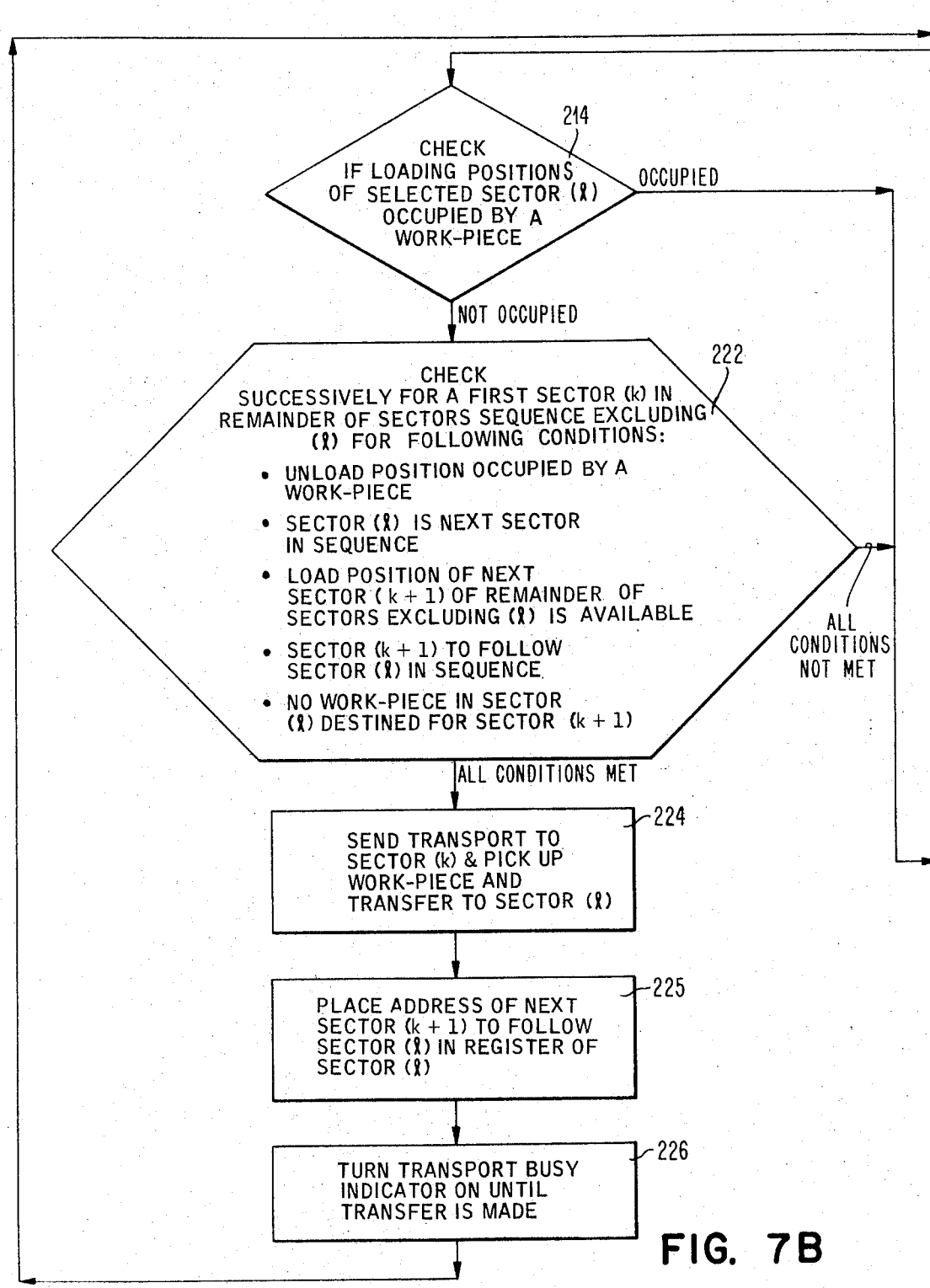
Figure 7C:
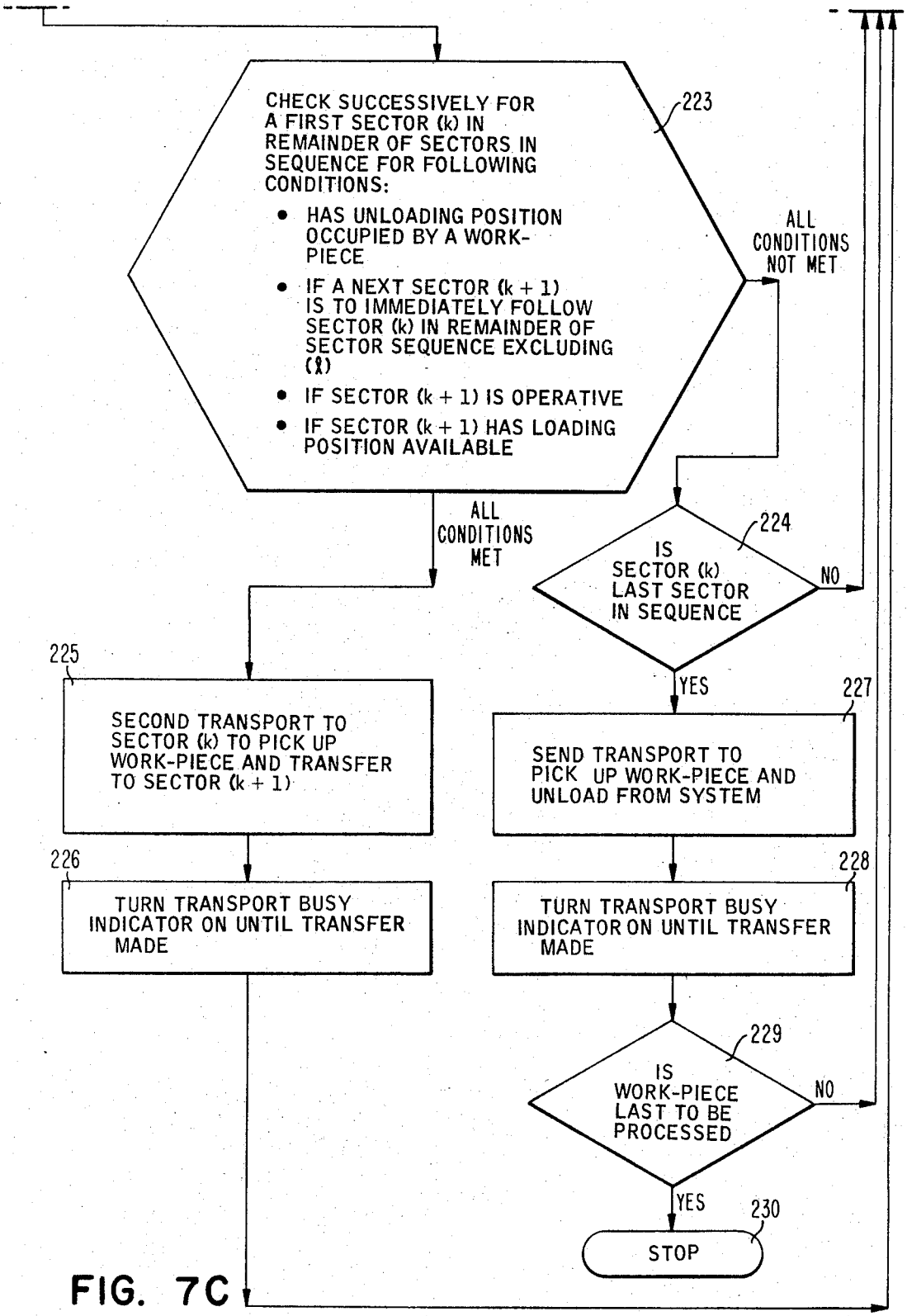

A second mode of operation comprehended in this is directed to the transfer of a work-piece to a plurality of processing sectors wherein is included selected processing sectors (L) to which the work-piece is transferred at least twice either prior to transfer to another of the remaining processing sectors K+(e.g.K, K+1 . . . K+n) or after leaving any of the other remaining processing sectors $K_x$. In this mode of operation as illustrated in FIG. 7 the control system begins with a START Step 205 to initiate operation.

On initiation of the control system, it precedes to Step 206 to check the transport busy signal, of its indicator, to see if the transport is presently transporting a work-piece between any of the processing sectors. If the transport unit is presently transporting a work-piece, the determination of Step 206 is repeated until the transport unit is found to be available for transferring another work-piece, at which time it will proceed to Step 207. In Step 207 a check is made to determine if a work-piece is occupying an output position of any selected sector (L) which is utilized twice for processing a work-piece therethrough in a prescribed sequence of operations. If an output station of a selected sector (L) is found occupied by a work-piece, the system proceeds the Step 213. However, if no output stations of a selected sector (L) is occupied by a work-piece, the system proceeds to Step 214.

If a determination is made in Step 213 that the sector (L) is the last sector in the sequence required to process a work-piece, the system will proceed to Step 214 wherein the transport system is directed to the selector sector (L) to pick up the work-piece and to unload it from the system, while concurrently, as indicated by Step 216, turning the transport system busy signal on until the transfer is made to unload the workpiece from the processing system. A subsequent Step 217 a determination is made to find if the work-piece being transferred is the last of a scheduled series to be processed. On a positive determination, the system proceeds to stop Step 218 which terminates operation of the control system. However, if the determination of Step 217 is negative indicating that additional work-pieces are to be processed, the system returns to Step 206 to repeat the indicated determination thereof.

If the determination in step 213 shows that the selected sector (L) is not the last sector in a specified sequence of processing sectors, the system moves to Step 219 to make determination if the input position is available in the next sector (L+1), which can include a sector $K_x$, whose address specified is in a determination register of the selected sector (L). If the determination is negative, the system will proceed to Step 214 which, as previously indicated, is also responsive to Step 207. Conversely, if the determination in Step 219 indicates that an input or load position is available in the next sector (L+1) whose address is specified in the destination register of the selected sector, whereby the transport is directed to make the transfer. Concurrently, as indicated in Step 221, the transport system's busy indicator will be turned on and maintained on until the transfer is made whereupon, the system returns to Step 206 for repeating the determination therein.

In Step 214 (responding to the determinations of both Steps 207 and 219), a determination is made if a selected sector (L) has a loading or input position occupied by a workpiece. On a negative determination indicating that the loading position is not occupied, the system proceeds to Step 222, and conversely, on a positive finding that the loading position of a selected sector (L) is occupied by a work-piece, the system moves to Step 223.

In Step 222, each of the remaining sectors (in a prescribed sequence of sectors but excluding any selected sector (L) are checked to find a first sector (K) meeting all of a plurality of conditions, to wit. Specifically, the first of the conditions is to determine if a processing sector (K) has its unload or output position occupied by a work-piece. Secondly, a determination is made if a selector sector (L) is to be the next sector to follow sector (K) in the prescribed sequence of processing sectors. The third condition determined is whether the load or input position of the next sector (K+1) (of the remainder of sectors in the sequence excluding the selected sector (L)), is available. The fourth condition determination is whether the sector (K+1) is to follow a selected sector (L) in the sequence and finally, the fifth condition determined is whether there is no work-piece in a selected sector (L) destined for sector (K+1). For this fifth condition, a positive determination is made on a finding that yes there is no work-piece in the indicated selected sector (L). If all conditions of the determination of Step 222 are not met, the control system proceeds to Step 223, which as above indicated is also responsive to the determination of Step 214. If all the conditions of Step 222 are met, the control system proceeds to Step 224 which will direct the transport system to proceed to the sector (K) where it will pick up a work-piece from its unload position and transfer it to the loading position of a selected sector (L). Concurrently, in Step 225 an address is placed in the destination register of the selected sector (L) indicating that sector (K+1) is to follow it in the sequence of processing sectors. Also, as indicated in Step 226 the transport busy signal indicator will be turned on and maintained on until the indicated transfer of the work-pieces is made, whereupon the control system will return to Step 206 repeating the determination of this step.

In Step 223, a check is made of successive processing sectors $K_x$ excluding the selected sectors (L) to find a first sector (K) which first meets all of the four following conditions. The first condition to be met is whether a processing sector (K) has an unloading or output position occupied by a work-piece. A second condition is a determination of the existence of a succeeding sector (K+1) to immediately follow the sector (K) in the sector sequence. The third condition is a determination if the next sector (K+1) is operative, and whether the sector (K+1) has a loading or input position available to receive a work-piece. If no processing sector (K) is found meeting all conditions, the control system proceeds to Step 224. Conversely, on finding of a processing sector (K) first meeting all conditions specified in Step 223, the control system proceeds to Step 225 which directs the transport system to proceed to the unloading position of the sector (K) to pick up a work-piece and transfer it to the loading position of the sector (K+1). Concurrently, as indicated in Step 226, the control system will have its busy indicator turned on in which condition it will be maintained until the transfer of the work-piece. Upon completion of the transfer, the control system will return to Step 206 for repeating the determination therein.

As indicated above, if the determination of Step 223 indicates the absence of any processing sector (K) meeting the conditions specified in the control system will then proceed to Step 224 which determines whether any processing sector (K), excluding any selected select (L), is the last sector in the prescribed sequence of processing sectors. If the determination is negative, the control system will return to Step 206 for repeating the determination therein. Conversely, if the determination is positive, the control system will proceed to Step 227 which will direct the transport system to proceed to the output station of the processing sector (K) for purposes of unloading the work-piece from the manufacturing system, while concurrently, turning on the busy indicator of the transport system, which condition will be maintained until the transfer is made, as indicated in Step 228. In the next operation, the control system proceeds to Step 229 for purposes of determining if the work-piece transferred is the last of a series to be processed. If the determination is negative, the control system returns to Step 206 for again repeating the determination therein, while, conversely, if the determination is positive, indicating that the work-piece is the final one of a series to be processed. The control system proceeds to Step 230 to suspend the operation of the control system.

Figure 8B:
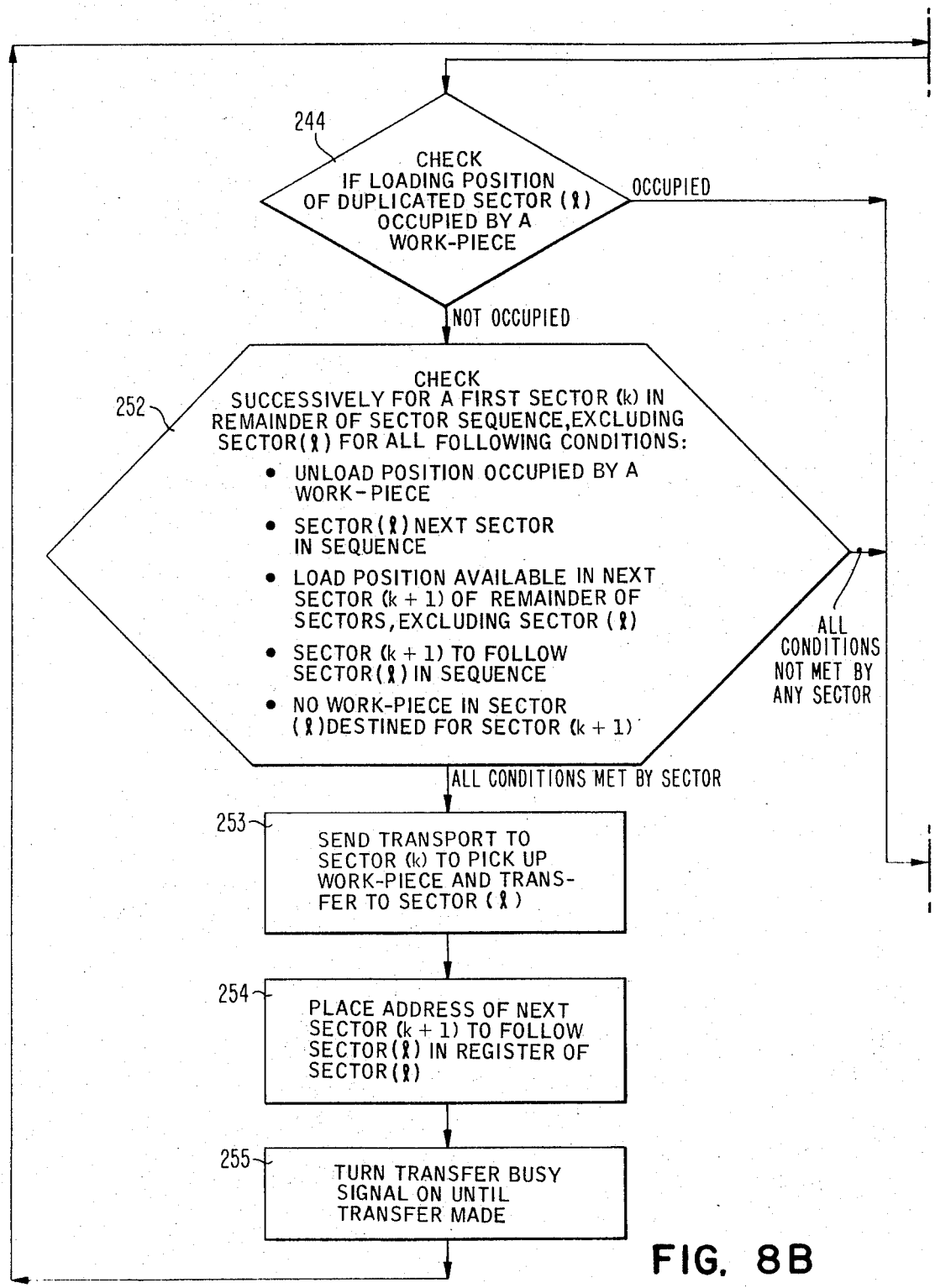
Figure 8C:
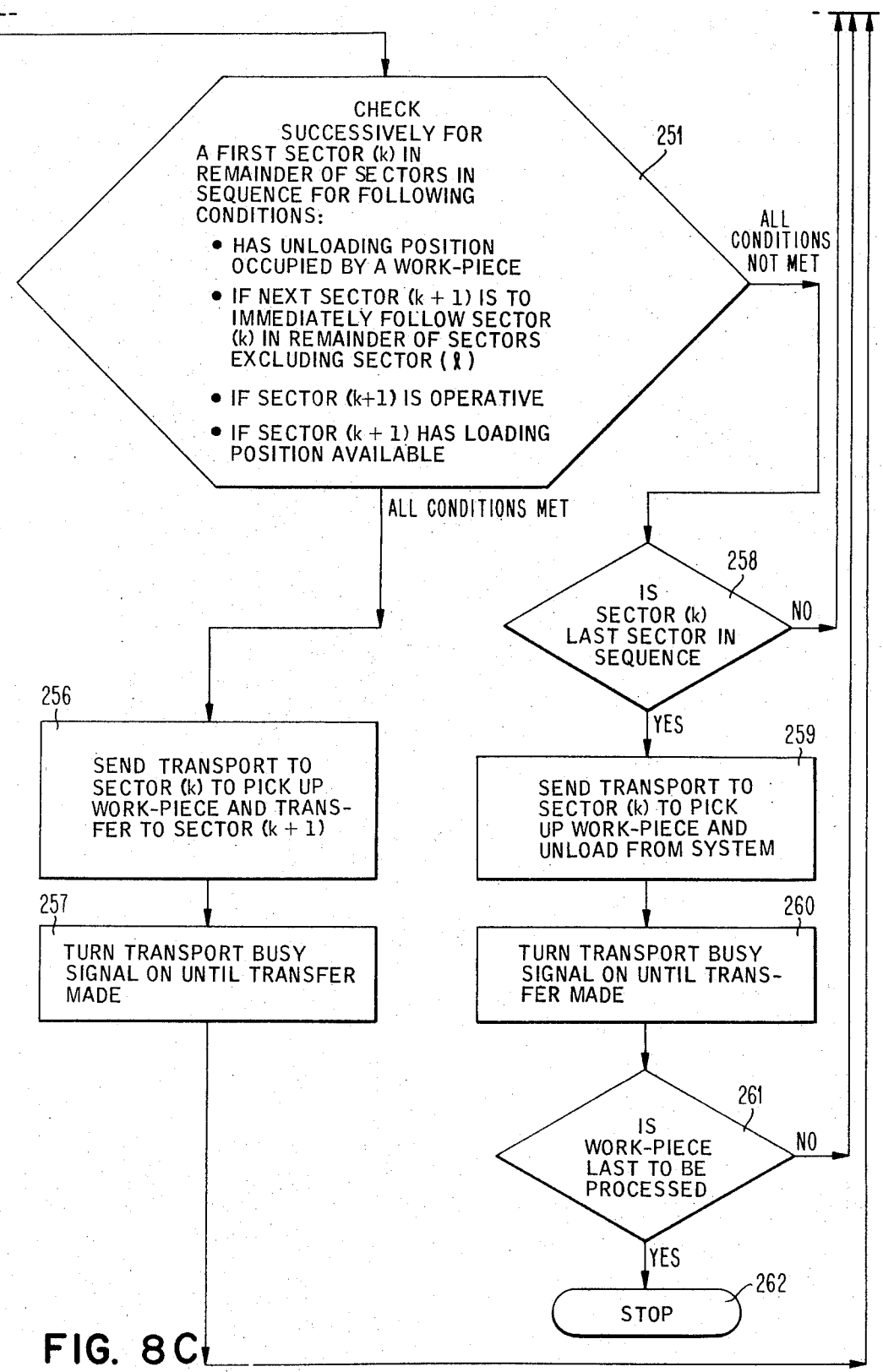

FIG. 8 illustrates a control system for use with the manufacturing system of this invention when at least two of the processing sectors are duplicated to have substantially similar operations, as exemplified by the use of the two photoresist pattern generator units 6 in FIG. 1 when te system is adapted for processing of semiconductor devices. In this mode of operation, the system is initiated at Step 240 which begins operation. When the system is initiated, it proceeds to Step 241 to determine if transport system is busy supporting a wafer in transfer between processing sectors. If the transport system is found to be available, at which time the operation proceeds to Step 242. In Step 242 a check is made of the output positions of the duplicated sectors (L) until a first work-piece present signal is found or until all duplicated sectors have been checked. If an output position of a duplicated sector (L) is found occupied by a work-piece, the operation of control system will proceed to Step 243. Conversely, if none of the output positions of the duplicated sectors is found occupied by a work-piece, the control system will proceed to Step 244.

In Step 243, a determination is made whether any of the duplicated sectors (L) is the last sector in a prescribed sector squence. If a determination is made that a duplicated sector (L) is the llast sector of the sequence, the system will proceed to Step 245, whereas if it is found that no duplicated sector (L) is the last sector in the sequence, the control system will proceed to Step 246. In response to a finding in Step 243 that a duplicated sector (L) is the last sector in a sequence of processing operations, Step 245 will direct the transport system to proceed to the duplicated sector (L) in point to pick up the work-piece and proceed to unload it from the system, while concurrently, in Step 247, turning on the transport busy signal indicator, in which condition it will be maintained until the work-piece is unloaded from the system. On completion of the operation of Step 247, the control system will proceed to Step 248 where a determination is made as to whether the work-piece unloaded is the last one of a scheduled series to be processed through the various processing sectors. If the determination of Step 248 is positive, the system will proceed to Step 249 to terminate operation of the control system. Conversely, if the finding of Step 248 is negative, the control system will return to Step 241 for repeating the determination specified in this operation.

As indicated above, if the determination of Step 243 is that the duplicated sector (L) is not the last sector in the sequence, Step 246 will make a determination if an input or load position is available in a processing sector (L+1) which is to follow the operation in a duplicated sector (L) in the specified sequence of processing sectors. Normally, each duplicated sector (L) will have a destination register associated with it in which the address of the next processing sector (L+1), in the sequence of processing sectors, will be placed.

In a negative determination is made in Step 246 indicating that the input position of the following sector (L+1) is not available, the control system will proceed to Step 244, which as indicated above is also responsive to a negative determination made in Step 242. On a positive determination Step 246, that an input position is available in the following sector (L+1) of the prescribed sequence of processing sectors, the control system will proceed to Step 250 wherein the transport system will be directed to pick up a work-piece, at the output position of the duplicated sector (L) and to drop it off at the input position of the following sector (L+1) whose address is specified by the contents of the duplicated sector (L)'s destination register. Concurrently, Step 251 will direct the transport system to have its busy indicator turned on which condition will be maintained until transfer of the work-piece is made, following which, the control system will return to Step 241 for repeating the determination indicated therefore.

On a finding in Step 252 that no output or unload position of a duplicated sector (L) is occupied by a work-piece for transfer, or if occupied by a work-piece that no transfer is possible as determined in Step 246, the control system will proceed to Step 244 where a determination is made if an input or loading position of a duplicated sector (L) is occupied by a work-piece, control system will proceed to Step 251. However, if a negative determination is made in Step 244, that an output position of a selected sector (L) is available, the control system will proceed to Step 252.

When an input position of a duplicated sector (L) is found, in Step 244, to be available to receive a work-piece a determination is made in Step 252 at successive ones of each of the remaining sectors, excluding duplicated sectors, to find a first of these sectors (K) which meets each of five conditions. The first of these conditions is whether the sector (K) has an output or unload position occupied by a work-piece for transfer to another sector. The second condition is whether one of the duplicated sectors (L) is to be processing operations, and whether an input or load position of a next sector (K+1) of the remainder of sectors in a sequence (excluding the duplicated sectors) is available to receive a work-piece, and whether the sector (K+1) is to follow a duplicated sector (L) in the prescribed sequence of processing operation. In addition a determination is also made as to the absence of a work-piece in a duplicated sector (L) destined for transfer to the sector (K+1). If no processing sector excluding the duplicated sectors, is found meeting any of the conditions specified in the Step 252, the control system will proceed to Step 253, which directs a transport system to the processing sector (K) to pick up the work-piece at the output or unload position thereof and transfer it to a duplicate sector (L), while at the same time, by Step 254, placing the address of the next sector (K+1) which is to follow the sector (L) in the destination register thereof. Concurrently, by Step 255, the transport busy indicator signal will be turned on and maintained in this condition until the indicated transfer of the work-piece is made, whereupon the control system will return to Step 241 to repeat the determination specified therefore. On a positive determination of Step 244, and a negative determination of Step 252, the control system, as indicated above, will proceed to Step 251.

In Step 251 each of the remainder of processing sectors (K) excluding the duplicated sectors, of the specified sequence of processing sectors, will be checked to find a first sector (K) meeting each of four conditions. The first condition is whether a sector (K) has an output or unloading position occupied by a work-piece for transfer to another sector. Also, whether the next sector (K+1) is to immediately follow the sector (K). Another condition is whether the following sector (K+1) is operative, and finally, whether the next sector (K+1) to follow sector (K) has an input or loading position available to receive a work-piece. If no sector is found meeting all the conditions specified in Step 251, the control system will proceed to Step 258. However, when the first sector (K) is found meeting all conditions specified in Step 251, the control system will proceed to Step 256 where the transport system will be dispatched to the output position of processing sector (K) where it will pick up the work-piece and transfer it to the input position of the following sector (K+1), while concurrently turning on, in Step 257, the transport busy signal on until the indicator transfer of the work-pieces is made, after which the control system will return to Step 241 to again renew the determination specified therefore.

In Step 258, in response to a determination that no processing sector (excluding the duplicated sectors) in the prescribed sequence of sectors meets all the conditions specified in Step 251, a determination is made to whether any sector (K) is the last sector specified in the sequence of processing operations. On a negative determination in Step 258, the control system will return to Step 241, whereas on a positive determination a Step 258, the control system will proceed to Step 259 wherein the transport system will be directed to the output or unloading position of the sector (K) in order to pick up the work-piece and to unload from the system, while at the same time turning on the transport proceeding indicator signal on until the work-piece is unloaded from the system, as indicated in the Step 260, the control system will again return to Step 241 to repeat its determination. On a positive determination in Step 261 that the work-piece is in fact the last of the series scheduled to be processed, the control system will proceed to Step 262 which will terminate operation of the control system.

FIG. 9 illustrates the adaptation of the control system of FIG. 8 to the processing of the above indicated field effect transistor devices as applied to FIG. 1. As previously noted, such a field effect transistor manufacturing system will comprise, with reference to FIG. 1, and oxidation sector 1A, a source and drain fabricating sector 1B, a gate oxidation sector 1C, two pattern generating units 6 as grouped within a resist exposure sector 1D, a metallization sector 1E, and a sintering sector 1F. For purposes of illustration, the various processing sectors will be classified into two categories. In the first category will be the first group of sectors referred to as pattern generating sectors (e.g. pattern generating unit 6) which will be re-visited by semiconductor wafers after the wafers leave the other remainder of the processing sectors. The general term "processing sectors" will be applied to the remainder of the sectors, excluding the pattern generating sectors. Thus, for the purpose of this explanation, the manufacturing system will contain processing sectors, e.g. 1A, 1B, 1C, 1E, and 1F and also, pattern generating sectors as represented by pattern generating units 6. In operation, a fixed routing will exist (e.g. all wafers to follow the same path through all sectors) with the routing alternating between visits to a processing sector and to a pattern generating sector. In addition, as indicated previously, each of the various sector times will have an input pedestal and an output pedestal.

The logic of moving wafers between the various sectors is based on knowing the status of these inputs and output pedestals, and in the special case of delivering of a wafer to a pattern generating unit 6, remembering what sector that wafer is destined for upon exit of the pattern generating units. Therefore, the logic of the control system depends upon an "output pedestal status" indicator for each sector and an "input pedestal status" indicator for each sector. Additionally, a "pattern generator destination register" is maintained which represents the address of the sector to which a wafer must be sent upon exiting from a specific pattern generator unit 6. Also, a transport "indicator" is maintained to reflect the availabilty of the transport to do work. The logic of the control system of FIG. 18 is based on a continuous polling of the indicators mentioned above in such a way that an objective of trying to keep each of the various sectors input pedestal occupied by a wafer will be met. The strategy of control system is based on a continuous polling of the transport systems busy indicator until a " not busy" signal is found. Also, the first priority move of this system is to exit wafers from a pattern generator unit 6 following which the system will look for other moves for the wafers.

Initiation of the control system begins in START Step 265, following which the system proceeds to Step 266 is repeated until the transport system is found available whereupon the control system will proceed to Step 267.

In Step 267, a check is made of the output pedestal status indicator of each of the pattern generating units 6 in turn until a "wafer present" indication is found. If the determination in Step 267 indicates that no output position of pattern generator unit 6 is occupied by a wafer, the control system will proceed to Step 268. Conversely, if the determination of Step 267 shows that a wafer is present at an output pedestal of a pattern generating unit 6, then the control system will proceed to Step 269 wherein the transport system will be directed to pick up the wafer at the output pedestal of the sector, where wafer presence was noted, with the delivery of the wafer to the input pedestal of the next processing sector indicated in the "pattern generators destination register" associated with the pattern generating unit which is indicating a "wafer present" signal. Concurrently, as indicated in Step 270, this will also cause the transport busy indicator signal to be turned on until the move is completed whereupon the control system will return to Step 266 for repeating the determination therein.

In Step 268, a check is made of the "input pedestal status" of each pattern generating sector or unit 6 in turn, until an "available" pattern generating input pedestal is found, e.g. a pattern generating unit 6 having an input pedestal free of a wafer. If the determination of Step 268 indicates that there is no available pattern generating input pedestal, then the control system will return to Step 266 for repeating the determination indicated therefore. Conversely, if the determination of Step 268 indicates the existence of available input pedestal of a pattern generating unit 6, the control will proceed to Step 271.

With respect to Steps 267 and 268 and 271, it may be noted that priority scheduling in the control system is accomplished only as a "tie breaker", that is, if more than one move is possible at any instant in time, the polling sequence dictates the priority. Also, with respect to Step 269 it may be noted that it is not necessary to check the status of the receiving sectors input pedestal since a wafer would not have been sent to any pattern generating unit 6, if the next sectors input pedestal were occupied.

In Step 271, to the exclusion of pattern generating sectors 6, each remaining process sector (K), (where K equals K, K+1, K+2, . . . K+n), is checked for the existence of each of four conditions. The first condition to be determined in Step 271 is the determination as to whether a wafer is present, if not, then Step 271 is repeated for the next process sector (K+1) and the determination again reiterated through sector (K+n). If a wafer is found to be present on the output pedestal of a process sector (K) then the determination is made from the presence of the existence of three additional conditions. These conditions include the determination as to the status of the next process sector (K+1) to which the wafer is to be transferred via a pattern generating unit 6. For this purpose a determination is made whether the pedestal of a processing sector (K+1) is available to receive a wafer, as well as a determination whether this sector (K+1) is operational. In addition a determination is made as to the absence of any water in any pattern generating unit 6 destined for sector (K+1). As indicated previously if the above conditions are not met by a sector, then the determination of Step 271 is repeated through successive sectors. If the determination of Step 271 shows that no sector exists which meets all the conditions specified by this step, then the control system will proceed to Step 272 wherein a determination will be made whether or not the last wafer in a series has been processed. If the determination in Step 272 is positive, then the system will proceed to Step 273 to terminate operation. Conversely, if the determination of Step 272 is negative, then the control system will return to Step 266 to repeat the determination therein.

If the determination of Step 271 shows that a sector (K) exists where all conditions specified in this determination are met, the control system will proceed to Step 274 where the transport system will be directed to pick up the wafer at the output pedestal of a sector (K) for delivery of it to the pattern generating unit 6 whose input pedestal was noted to be available in Step 268. Also, Step 275 will concurrently place the address of the next processing sector (K+1) to which the wafer is to be subsequently transferred, into the pattern generator destination register associated with the pattern generator to which the wafer has been moved. In addition, as indicated in Step 276, the transport system busy indicator will be turned on until the wafer move is completed whereupon the control system will return to Step 264 for again repeating the determination therein.

While the invention has been particularly shown and described with reference to a preferred embodiment thereof, it will be understood by those skilled in the art that the foregoing and other changes in form and detail as may be made therein without departing from the spirit and scope of the invention.

What is claimed is:

1. A manufacturing system for processing work-pieces comprising:
   A. a plurality of processing work stations, having loading and unloading positions, each of said stations performing different processing operations on said work-pieces;
   B. a conveyor means for transporting individual ones of said work-pieces between and at any selected ones of said stations;
   C. means for transferring said individual ones of said work-pieces between said conveyor means and said stations at their said loading and unloading positions; and
   D. control means for said conveyor means and transfer means for routing said work-pieces individually between and at selected ones of prescribed sequence of processing operations, with said control means comprising
   E. first means for
      a. determining at successive ones of each of a prescribed sequence of said stations
         i. if the conveyor means is transporting a said work-piece
         ii. if the unloading position is occupied by a said work-piece
         iii. if the next succeeding station is operative and
         iv. if the loading position of the said next station is not occupied by a said work-piece, and
      b. generating a control signal representing
         i. the first positive said determination of all said conditions at one of said sequence of stations and ii. a negative determination of at least one of said conditions at all of said stations in said sequence thereof, F. second means responsive to said control signal for
   a. maintaining iterative determination by said first means on a negative determination
   b. transferring a work-piece to said conveyor means from the station at which a first positive determination was made,
   c. dispatching said work-piece on said conveyor means to the loading position of the next station in said prescribed sequence thereof for transfer of the workpiece thereto, and
   d. return operation of said system to said first means for repeating its said determination thereat.

2. The manufacturing system of claim 1 wherein said work-pieces comprise semiconductor substrates.

3. The manufacturing system of claim 2 wherein said stations comprise means for performing semiconductor processing operations.

4. A manufacturing system for processing work-pieces comprising:

A. a plurality of processing stations having loading and unloading positions, each of said stations performing different processing operations on said work-pieces, B. a conveyor means for transporting individual ones of said work-pieces individually between and at selected ones of said work stations;

C. means for transferring individual ones of said work-pieces between said conveyor means and said stations at their said loading and unloading positions;

D. controls means for said conveyor means and transfer means for routing individual one of said work-pieces between and through a prescribed sequence of selected ones of said stations for a corresponding sequence of processing operations therein including routing of said work-pieces at least twice to a selected one of said stations with said control means comprising E. means for storing in said selected one station the location of the next of said stations to be employed in said prescribed sequence of stations F. first means for
   a. determining if said conveyor means is carrying a said work-piece, and
   b. generating a first control signal if said determination is negative, and
   c. iterating said determination of said first means if said determination is positive;

G. second means responsive to said first control signal for determining if the unloading position of said selected one station is occupied by a said work-piece, and generating a second control signal representing a positive determination or a negative determination;

H. third means responsive to said second control signal representing a positive determination for
   a. dispatching said conveyor means to said selected one station, transfer of said work-pieces therefrom to said conveyor means and dispatching said conveyor means for delivery of said work-piece at the next stations specified by the associated address in said storage means of said selected one station,
   b. and return operation of said system to said first means for repeating its said determination thereat;

I. fourth means responsive to a negative determination of said second control signal for determining if the load position of said selected one station is occupied by a said work-piece and
   a. generating a third control signal representing the absence of a work-piece at the load position of said selective one station, and
   b. returning operation of said system to said first means if said determination of said fourth means is positive;

J. fifth means responsive to said third control signal for
   a. determining at successive ones of each of the remainder of said stations in said prescribed sequence
      i. if the unloading position is occupied by a said work-piece
      ii. if the next succeeding station in said prescribed sequence is operative
      iii. if the loading position of the said next succeeding station is not occupied by a said work-piece and
      iv. if the said selective one station does not contain a work-piece to be transferred to said next succeeding station, and
   b. generating a fourth control signal representing a first positive determination
      i. if all said conditions are positive and
      ii. if said selected one station is not the next succeeding work-station in said prescribed sequence and K. sixth means responsive to said fourth control signal for
   a. dispatching said conveyor means to the unload position of the station first supporting generation of said fourth control signal representing a first positive determination and transferring a work-piece therefrom to said conveyor means, and
   b. dispatching said conveyor means for delivery of said work-piece to the next of said remainder of station of said prescribed sequence in response to said fourth control signal representing said first positive determination, and
   c. dispatching said conveyor means for delivery of said work-piece to said selected one station, in response to said fourth control signal representing said second positive determination, and storing in the storage means thereof the address of the next succeeding station of said prescribed sequence, and
   d. returning operation of said system on completion of the transfer of said work-piece to said first means for its said determination thereat.

5. The manufacturing system of claim 4 wherein said work-pieces are semiconductor substrates.

6. The manufacturing system of claim 5, wherein said stations include means for performing semiconductor processing operations.

7. The manufacturing system processing work-pieces comprising:

A. a plurality of processing stations having loading and unloading positions, each of said stations performing different operations on said work-pieces, with at least one of said stations replicated at least twice an having substantially similar processing operations to which individual ones of said work-pieces can be transferred from the remainder of said stations in accordance with a prescribed sequence of said stations;

B. a conveyor means for transporting single ones of said work-pieces individually between and at any selected one of said stations;

C. means for transferring said individual ones of said work-pieces between said conveyor means and said stations at their said loading and unloading positions; and D. control means for said conveyor means and transfer means for routing individual ones of said work-pieces between and at selected ones of said prescribed sequence of selected ones of stations for a corresponding sequence of processing operations, with said control means comprising E. means for said replicated stations for storing the locations of the next of said stations to be employed in said prescribed sequence, F. first means for
 a. determining if said conveyor means is carrying a said work-piece
 b. generating a first control signal if said determination is negative and
 c. iterating said determination of said first means if said determination is positive G. second means responsive to said first control signal for determining if the unloading positions of said replicated stations are occupied by a said work-piece, and generating a second control signal representing either a positive or a negative determination H. third means responsive to a positive determination of said second control signal for
 a. dispatching said conveyor means to the unload position of said replicated stations found occupied by a said work-piece, transfer of said work-piece therefrom to said conveyor means and dispatching said conveyor means for delivery of said workpieces to the next of said remainder of stations specified by the associated address in the storage means of said replicated stations,
 b. returning operation on completion of said work-pieces transfer to said first means for repeating its said determination thereat;

I. fourth means responsive to a negative determination of said second control signal for
 a. determining if the load positions of said replicated stations are occupied by a said work-piece and
 b. generating a third control signal representing the absence of a work-piece at a load position of one of said replicated stations and
 c. returning operation of said system to said first means if said determination of said fourth means is positive representing that all load positions of said replicated stations are occupied by a said work-piece;

J. fifth means responsive to said third control signal for
 a. determining at successive ones of said remainder of stations in the said prescribed sequence
  i. if the unloading position is occupied by a said work-piece
  ii. if the next succeeding one of said next succeeding station is not occupied by a said work-piece and
  iii. if said replicated stations do not contain a said work-piece to be transferred to the said next succeeding station,
 b. generating a fourth control signal if all said conditions are positive, and
 c. returning control of said system to said first means on a negative determination of at least one of said conditions at each of said remainder of stations K. sixth means responsive to said fourth control signal for
 a. dispatching said conveyor means to the unload position of the one of said remainder of stations first found supporting generation of said fourth control signal, and
 b. transferring a work-piece therefrom to said conveyor means
 c. dispatching said conveyor means to deliver said work-piece to a loading position of said replicated stations unoccupied by a said work-piece,
 d. storing in the storage means of said replicated stations the address of the next succeeding one of said stations in said prescribed sequence, and
 e. returning operation of said system, on completion on of the transfer of said work-piece, to said first means for its said determination therein.

8. The manufacturing system of claim 7 wherein said work-pieces comprise semiconductor substrates.

9. The manufacturing system of claim 8 wherein said stations include means for performing semiconductor processing operations.

10. The manufacturing system of claim 9 wherein said replicated stations comprise means for exposing a layer of photoresist in a predetermined pattern specified by said prescribed sequence of processing operations.

11. The manufacturing system for processing work-pieces comprising:

A. conveyor means for transporting individual ones of said work-pieces between and at any selected one of a plurality of locations along the path thereof B. a plurality of processing stations at respective ones of said locations for performing processing operations on said work-pieces and having loading and unloading stations for corresponding feeding and discharging the individual ones of said work-pieces with at least three required sequential ones of said stations having the first and third stations disposed adjacent one end of said conveyor paths and the second station of said sequence disposed adjacent the other end of said conveyor path C. means for transferring said individual ones of said work-pieces between said conveyor means and said stations at their said loading and unloading means D. control means for said conveyor means and transfer means for routing individual ones of said work-pieces between and at selected ones of a prescribed sequence of selected ones of said stations for a corresponding sequence of processing operations therein, said control means comprising E. first means for
  a. determining at successive ones of each of said prescribed sequence of stations if
    i. the conveyor means is transporting a said work-piece
    ii. the unloading position is occupied by a said work-piece
    iii. if the next succeeding station of said prescribed sequence is operative and
    iv. if the loading position of said next succeeding station is not occupied by a said work-piece and
  b. generating a control signal representing
    i. the first positive said determination of all said conditions at one of said stations of said prescribed sequence and
    ii. a negative determination of at least one of said conditions at all said work stations of said prescribed sequence,
F. second means responsive to said control signal for
  a. maintaining iterative determination by said first means on a negative determination,
  b. transferring a work-piece to said conveyor means from the stations at which a first positive determination was made
  c. dispatching said conveyor means to the loading position of the next station in said prescribed sequence of stations for transfer of a transported work-piece thereto and
  d. return operation of said system to said first means for repeating its said determination therein.

12. The manufacturing system of claim 11 wherein said work-pieces comprise semiconductor substrates.

13. The manufacturing system of claim 12 wherein said stations include means for performing semiconductor processing operations.

14. A manufacturing system for processing work-pieces comprising:
  A. conveyor means for transporting individual ones of said work-pieces between and at any selected one of a plurality of locations along the path thereof
  B. a plurality of processing stations at respective ones of said location for performing processing operations on said work-pieces, and having loading and unloading means for corresponding feeding and discharge of single ones of said work-pieces with at least three required sequential ones of said stations having the first and third stations disposed adjacent one end of said conveyor path and the second station of said sequence disposed adjacent the other end of said conveyor path
  C. means for transferring said individual ones of said work-pieces between said conveyor means and said stations at their said loading and unloading means; and
  D. control means for routing individual ones of said work-pieces at least twice to a selected one of said stations, said control means comprising
  E. means for storing the location of the next of said stations following said selected one station to be employed in said prescribed sequence,
  F. first means for
    a. determining if said conveyor means is carrying a said work-piece
    b. generating a first control signal if said determination is negative and
    c. iterating said determination of said first means if said determination is positive
  G. second means responsive to said first control signal for determining if the unloading means of said selected one station is occupied by a said work-piece and generating a second control signal representing either a positive determination or a negative determination
  H. third means responsive to a positive determination of said second control signal for
    a. dispatching said conveyor means to said selected one station, transfer of said work-piece therefrom to said conveyor means and dispatching said conveyor means for delivery of said work-pieces at the loading means at the next station specified by the associated address in the storage means of said selected one station and
    b. returning operation of said system to said first means for repeating its said determination thereat;
  I. fourth means responsive to a negative determination of said second control signal for
    a. determining if the load means of said selected one station is occupied by a said work-piece and
    b. generating a third control signal representing the absence of a work-piece at the load means of said selected one station and
    c. returning operations of said system to said first means if said determination of said fourth means is positive
  J. fifth means responsive to said third control signal for
    a. the determining at successive ones of each of the remainder of said stations in the said prescribed sequence
      i. if the loading means is occupied by a said work-piece
      ii. if the next succeeding, of said prescribed sequence, station is operative
      iii. if the loading means of said next succeeding station is not occupied by a said work-piece and
      iv. if the said selected one station does not contain a work-piece to be transferred to said next succeeding work station, and
    b. generating a fourth control signal representing a first positive determination
      i. if all said conditions are positive and
      ii. said selected one station is not the next succeeding station in said prescribed sequence, and
    representing a second positive determination
      i. if the first three of said conditions are positive and
      ii. said selected one station is the next succeeding station in said prescribed sequence and
    c. returning control of said system to said first means in the absence of said fourth control signal
  K. sixth means responsive to said fourth control signal for
    a. dispatching said conveyor means to the unload means of the station first supporting generation of said fourth control signal, representing said firm positive determination and transferring a work-piece therefrom to said conveyor means and dispatching said conveyor means for delivery of said work-piece to the load means of the next of the said remainder of stations in said prescribed sequence, in response to said fourth control signal representing said first positive determination, and b. dispatching said conveyor for delivery of said work-piece to the load means of said selected one station in response to said fourth control single representing said second positive determination and storing in the storage means thereof the address of the next succeeding station in said prescribed sequence and c. returning operation of said system, on completion of the transfer of said workpiece to said first means for its said determination thereat.

15. The manufacturing system of claim 14 wherein said work-pieces comprises a semiconductor substrate.

16. The manufacturing system of claim 15 wherein said stations include means for performing semiconductor processing operations.

17. A manufacturing system for processing work-pieces comprising

A. a conveyor means for transporting individual ones of said work-pieces between and at any selected one of a plurality of locations along the path thereof;

B. a plurality of processing stations at respective ones of said locations for performing processing operations on said work-pieces and having loading and unloading means for corresponding feeding and discharging of individual ones of said workpieces, with at least three required sequential ones of said stations having the first and third stations disposed adjacent one end of said conveyor path, and with at least one of said work stations replicated at least twice to have substantially similar processing operations to which said work-piece can be transferred from the remainder of said work stations in accordance with a prescribed sequence thereof C. means for transferring said individual ones of said work stations at their said loading and unloading stations and D. control means for said conveyor and transfer means for routing individual ones of said work-pieces between prescribed sequence of said stations for a corresponding sequence of processing operations therein, with said control means comprising E. storage means for said replicated work stations for storing the location of the next said station to be employed subsequent thereto in said prescribed sequence, F. first means for
  a. determining if said conveyor means is carrying a said work-piece
  b. generating a first control signal if said determination is negative and
  c. iterating said determination of said first means if said determination is positive G. second means responsive to first control signal for determining if the unloading means of said replicated station is occupied by a said workpiece, and generating a second control signal representing either a positive or a negative determination H. third means responsive to a positive determination of said control signal
  a. dispatching said conveyor to the unload of said replicated stations found occupied by a said work-piece, transfer of said work-piece therefrom to said conveyor means and dispatching said conveyor means for delivery of said work-piece to the next of said remainder of said stations specified by the associated address in the storage means of said replicated stations and
  b. on completion of said work-piece transfer, returning operation of said system to said first means for repeating its said determination therein I. fourth means response to a negative determination of said second control signal for
  a. determining if the load means of said replicated stations are occupied by a said work-piece
  b. generating a third control signal representing the absence of a work-piece at a load means of one of said replicated stations, and
  c. returning operation of said system to said first means if said determination of said fourth means is positive representing that all load means of said replicated stations are occupied by a said work-piece J. fifth means responsive to said third control signal for
  a. determining at successive ones of said remainder of station in the said prescribed sequence
    i. if the unloading means is occupied by said work-piece
    ii. if the next succeeding one of said remainder of work station in said prescribed sequence, is operative
    iii. if the loading means of the said next succeeding station is not occupied by a said work-piece and
    iv. if said replicated stations do not contain a said work-piece to be transferred to the said next succeeding one station and
  b. generating a fourth control signal if all said conditions are positive and
  c. returning control of said system to said first means on a negative determination of at least one of said conditions at each of said remainder of stations;

K. sixth means responsive to said fourth control signal for
  a. dispatching said conveyor means to the unload means of one of said remainder of work stations first found supporting generation of said fourth control signal
  b. transferring a work-piece therefrom to said conveyor means,
  c. dispatching said conveyor means to deliver said work-piece to unload means of said replicated stations unoccupied by a said work-piece,
  d. storing in the storage means thereof the address of the next succeeding one of the said stations in said prescribed sequence thereof, and
  e. returning operation of said system, upon completion of the transfer of said work-piece to said first means for its said determination thereat.

18. The manufacturing system of claim 17 wherein said work-pieces comprise semiconductor substrates.

19. The manufacturing system of claim 18 wherein said stations include means for performing semiconductor processing operations on said substrates.

* * * * *